US010562611B2

(12) United States Patent
Mueller et al.

(10) Patent No.: US 10,562,611 B2
(45) Date of Patent: *Feb. 18, 2020

(54) CONTROLLED FLIGHT OF A MULTICOPTER EXPERIENCING A FAILURE AFFECTING AN EFFECTOR

(71) Applicant: ETH Zurich, Zurich (CH)

(72) Inventors: Mark W. Mueller, Zurich (CH); Sergei Lupashin, Zurich (CH); Raffaello D'Andrea, Wollerau (CH); Markus Waibel, Zurich (CH)

(73) Assignee: ETH Zurich, Zurich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/390,831

(22) Filed: Apr. 22, 2019

(65) Prior Publication Data
US 2019/0283865 A1    Sep. 19, 2019

Related U.S. Application Data

(63) Continuation of application No. 15/833,385, filed on Dec. 6, 2017, now Pat. No. 10,308,349, which is a
(Continued)

(51) Int. Cl.
*G05D 1/00* (2006.01)
*G05D 1/08* (2006.01)
(Continued)

(52) U.S. Cl.
CPC .............. *B64C 13/24* (2013.01); *B64C 27/08* (2013.01); *B64C 27/20* (2013.01); *B64C 27/32* (2013.01);
(Continued)

(58) Field of Classification Search
CPC .............. B64C 13/24; B64C 2201/024; B64C 2201/027; B64C 2201/108;
(Continued)

(56) References Cited

U.S. PATENT DOCUMENTS 8,983,684 B2    3/2015  Callou
10,046,853 B2*  8/2018  Vander Mey ........... B64C 27/02
(Continued)

FOREIGN PATENT DOCUMENTS

WO    WO-2010128489 A2    11/2010
WO    WO-2012/080847 A2   6/2012

OTHER PUBLICATIONS

Zhou et al., "Dead Reckoning and Kalman Filter Design for Trajectory Tracking of a Quadrotor UAV", 2010 IEEE; pp. 119-124.
(Continued)

*Primary Examiner* — Harry Y Oh
(74) *Attorney, Agent, or Firm* — Blank Rome LLP

(57) ABSTRACT

According to a first aspect of the invention, there is provided a method for operating a multicopter experiencing a failure during flight, the multicopter comprising a body, and at least four effectors attached to the body, each operable to produce both a torque and a thrust force which can cause the multicopter to fly when not experiencing said failure. The method may comprise the step of identifying a failure wherein the failure affects the torque and/or thrust force produced by an effector, and in response to identifying a failure carrying out the following steps, (1) computing an estimate of the orientation of a primary axis of said body with respect to a predefined reference frame, wherein said primary axis is an axis about which said multicopter rotates when flying, (2) computing an estimate of the angular velocity of said multicopter, (3) controlling one or more of said at least four effectors based on said estimate of the orientation of the primary axis of said body with respect to said predefined reference frame and said estimate of the angular velocity of the multicopter. The step of controlling one or more of said at least four effectors may be performed such that (a) said one or more effectors collectively produce a torque along said primary axis and a torque perpendicular
(Continued)

to said primary axis, wherein (i) the torque along said primary axis causes said multicopter to rotate about said primary axis, and (ii) the torque perpendicular to said primary axis causes said multicopter to move such that the orientation of said primary axis converges to a target orientation with respect to said predefined reference frame, and (b) such that said one or more effectors individually produce a thrust force along said primary axis.

6 Claims, 8 Drawing Sheets

Related U.S. Application Data continuation of application No. 14/893,874, filed as application No. PCT/EP2014/061760 on Jun. 5, 2014, now Pat. No. 9,856,016.

(60) Provisional application No. 61/832,876, filed on Jun. 9, 2013, provisional application No. 61/888,930, filed on Oct. 9, 2013, provisional application No. 61/891,479, filed on Oct. 16, 2013.

(51) Int. Cl.
    *G05D 3/00*     (2006.01)
    *G06F 7/00*     (2006.01)
    *G06F 17/00*     (2019.01)
    *B64C 13/24*     (2006.01)
    *B64C 27/20*     (2006.01)
    *B64C 39/02*     (2006.01)
    *B64C 27/08*     (2006.01)
    *B64D 45/00*     (2006.01)
    *B64C 27/32*     (2006.01)

(52) U.S. Cl.
    CPC ............ *B64C 39/024* (2013.01); *B64D 45/00* (2013.01); *G05D 1/0072* (2013.01); *B64C 2201/024* (2013.01); *B64C 2201/027* (2013.01); *B64C 2201/108* (2013.01); *B64C 2201/127* (2013.01); *B64C 2201/141* (2013.01); *B64C 2201/146* (2013.01); *B64C 2203/00* (2013.01)

(58) Field of Classification Search
    CPC ........ B64C 2201/127; B64C 2201/141; B64C 2201/146; B64C 2203/00; B64C 27/08; B64C 27/20; B64C 27/32; B64C 39/024; B64D 45/00
    See application file for complete search history.

(56) References Cited

U.S. PATENT DOCUMENTS

| | | | |
|---|---|---|---|
| 2006/0151666 A1* | 7/2006 | VanderMey | ........ B64C 29/0016 244/12.3 |
| 2012/0232718 A1 | 9/2012 | Rischmuller | |
| 2013/0006448 A1* | 1/2013 | Callou | ................ A63H 27/12 701/5 |
| 2013/0020429 A1* | 1/2013 | Kroo | ..................... B64C 3/16 244/6 |
| 2015/0012154 A1 | 1/2015 | Senkel | |
| 2016/0023755 A1 | 1/2016 | Elshafei | |
| 2016/0068267 A1 | 3/2016 | Liu | |

OTHER PUBLICATIONS

F. Sharifi et al., "Fault Tolerant Control of a Quadrotor UAV Using Sliding Mode Control", 2010 Conference on Control and Fault Tolerant Systems, France, Oct. 6-8, 2010, IEEE, pp. 239-244.

Z. Cen et al., "Robust Fault Estimation on a Real C)uadrotor UAV Using Optimized Adaptive Thau Observer", 2013 International Conference on Unmanned Aircarft Systems (ICUAS), May 28-31, 2013, Atlanta, GA, IEEE, pp. 550-556.

I. Sadeghzadeh et al., "A Review on Fault-tolerant Control for Unmanned Aerial Vehicles (UAVs)", Infotech@Aerospace 2011, Mar. 29-31, 2011, St. Louis Missouri, American Institute of Aeronautics and Astronautics, pp. 1-12.

International Search Report for PCT/EP2014/061760, dated Nov. 25, 2014, 3 pages.

* cited by examiner

| Failure Mode | Standard Control | Disclosed Control Method |
| --- | --- | --- |
| a) | ✗ | ✓ |
| b) | ✗ | ✓ |
| c) | ✗ | ✓ |
| d) | ✗ | ✓ |
| e) | ✗ | ✗ |

FIG. 5

CONTROLLED FLIGHT OF A MULTICOPTER EXPERIENCING A FAILURE AFFECTING AN EFFECTOR

RELATED APPLICATIONS

This application is a continuation application of U.S. patent application Ser. No. 15/833,385, filed Dec. 6, 2017, which is a continuation of U.S. patent application Ser. No. 14/893,874, filed on Nov. 24, 2015, which is a national phase application of PCT/EP2014/061760, filed on Jun. 5, 2014, which claims the benefit of U.S. Provisional Application No. 61/832,876, filed on Jun. 9, 2013, U.S. Provisional Application No. 61/888,930, filed on Oct. 9, 2013 and U.S. Provisional Application No. 61/891,479, filed on Oct. 16, 2013. The entire contents of those applications are hereby incorporated by reference.

FIELD OF THE INVENTION

The present invention relates to the control of a multicopter experiencing a failure affecting an effector. In particular, the invention relates to a novel scheme for controlled flight that enables translational motion control or a multicopter by causing it to rotate and applying a novel control method, allowing the invention to be used as a failsafe control mechanism in case of effector failure in conventional hover-capable aerial vehicles equipped with multiple rigidly-attached fixed-pitch propellers ("multicopters").

BRIEF SUMMARY

In accordance with the present invention, limitations of previous methods for the control of multicopters have been substantially reduced or eliminated. In particular, it provides a flying vehicle control scheme for vehicles with as few as one functioning effector. In addition, it provides improved systems and methods for the control of flying vehicles in case of a failure affecting one or more effectors.

Technical advantages of certain embodiments of the present invention may allow to improve or simplify the design of existing multicopters. For example, multicopters may require less mass and face fewer design constraints and inherent limitations than current systems such as those that rely on effector redundancy (e.g., hexacopters and octocopters), or on the encasing of effectors (e.g., shrouds, ducted fans), or on parachutes as a safety backup.

Technical advantages of certain embodiments of the present invention may allow to increase the safety and reliability of existing multicopters. For example, the present invention may allow to minimize or eliminate risks inherent in such vehicles arising from collisions, mechanical or electrical failures, electronic malfunctions, operator errors, or adverse environmental conditions, such as wind or turbulence. The present invention may also mitigate the effects of failures, malfunction operator errors, and the like allowing for graceful degradation of performance rather than catastrophic failure with complete loss of control.

Other technical advantages of certain embodiments of the present invention may allow the use of multicopters for new applications by increasing the reliability and safety of multicopters, by allowing their use in a wider variety of operating conditions and environments, or by allowing partial or full automation of certain tasks currently performed by experienced human pilots with both manned and unmanned flying vehicles. The need for human pilots severely limits the cost-effectiveness, possible operating conditions, and flight endurance of multicopters in many applications. For example, even experienced human pilots cannot guarantee safe and efficient control in many real-world operating conditions including wind and turbulence.

Yet other technical advantages of certain embodiments of the present invention may allow it to be tailored to the specific needs of a variety of applications in a variety of contexts. Example applications include inspection and monitoring of civil infrastructure, which may require dangerous or repetitive tasks; industrial or public service applications (e.g., surveillance and monitoring of industrial sites, photogrammetry, surveying); professional aerial photography or cinematography; transport or delivery of cargo by air; or toys such as small flying vehicles; stage performances including choreographics set to music and light or theater per which require interaction with theater actors; hobbyist platforms for communities such as DIY Drones; research platforms for groups actively researching flying platforms or using them as part of their curriculum; military use with requirements such as survivability, power autonomy, detectability, or operation in extreme conditions (weather, lighting conditions, contamination). In particular, certain technical advantages allow the present invention to be equipped with a wide range of sensors. For example, infrared sensors allow embodiments for detection of patches of dry ground in orchards or for crop monitoring.

According to a first aspect of the invention, there is provided a method for operating a multicopter experiencing a failure during flight, the multicopter comprising a body, and at least four effectors attached to the body, each operable to produce both a torque and a thrust force which can cause the multicopter to fly when not experiencing said failure. The method may comprise the step of identifying a failure here in the failure affects the torque and/or thrust force produced by an effector, and in response to identifying a failure carrying out the following steps, (1) computing an estimate of the orientation of a primary axis of said body with respect to a predefined reference frame, wherein said primary axis is an axis about which said multicopter rotates when flying, (2) computing an estimate of the angular velocity of said multicopter, (3) controlling one or more of said at least four effectors based on said estimate of the orientation of the primary axis of said body with respect to said predefined reference frame and said estimate of the angular velocity of the multicopter. The step of controlling one or more of said at least four effectors may be performed such that (a) said one or more effectors collectively produce a torque along said primary axis and a torque perpendicular to said primary axis, wherein (i) the torque along said primary axis causes said multicopter to rotate about said primary axis, and (ii) the torque perpendicular to said primary axis causes said multicopter to move such that the orientation of said primary axis converges to a target orientation with respect to said predefined reference frame, and (b) such that said one or more effectors individually produce a thrust force along said primary axis.

The torque is that torque about the multicopter's center of mass.

The angular velocity is preferably the velocity at which the multicopter rotates with respect to an inertial frame.

Preferably, the step of controlling one or more of said at least four effectors, based on said estimate of the orientation of the primary axis of said body with respect to the predefined reference frame and said estimate of the angular velocity of the multicopter, comprises controlling said others of the at least four effectors not affected by a failure.

The torque and thrust are preferably a non-zero torque and a non-zero thrust.

Preferably, the torque and thrust force produced by each effector are inevitably, and intrinsically, linked.

Preferably, a component of the torque can be due to the effector thrust acting at a distance from the multicopter's center of mass. An additional component of the torque could be from a torque couple generated by the effector itself, for example due to aerodynamic effects on a rotating propeller.

In the present invention the primary axis need not be identical to a principle axis of inertia of the multicopter body.

Preferably, the primary rotation can at least be primarily created by the remaining effectors not affected by the failure. Specifically, by the component of the torques acting along the primary axis.

Preferably, the target orientation with respect to a predefined reference frame can be freely selected, and the target orientation can be both attained and maintained.

The target orientation with respect to a predefined reference frame can be thought of more specifically as a target orientation angle between the primary axis and the direction of gravity, or the vertical direction in an inertial frame.

Preferably the target orientation can be freely selected at run time, preferably from a range, or specified list, of target orientations.

Although in principle unbounded, typical target orientations would be in the range 0 degrees to 75 degrees, or more specifically, 0 degrees to 45 degrees from the direction opposite to gravity.

The azimuthal direction of the target orientation can be anywhere in the range of 0 degrees to 360 degrees.

An effector failure can specifically mean a substantial reduction in the effector's ability to produce a thrust force.

Such a failure could typically mean that the effector retains the ability to produce between 0% and 50% of its original capacity to produce thrust.

More specifically, it could be between 0% and 10% of the original capacity to produce thrust.

Failure can be caused by a variety of factors, including mechanical decoupling of an effector from the multicopter.

In case some effectors can no longer produce any thrust after the failure occurs, the effectors producing thrust along the primary axis could be all effectors not affected by the failures (e.g. if the failure is a motor falling off, all effectors for which the motor has not fallen off would produce thrust along the primary axis).

The method may further comprise the step of controlling one or more of said at least four effectors, based on (a) said estimate of the orientation of the primary axis of said body with respect to the predefined reference frame and (b) said estimate of the angular velocity of the multicopter, such that said thrust force produced along said primary axis by each of said one or more effectors which are without a failure is at least 20% or 30% of the thrust collectively produced by said one or more effectors which are without a failure when the orientation of said primary axis has converged to said target orientation.

The method may further comprise tire step of identifying a failure affecting the torque and/or thrust force, produced by an effector, where the failure causes the torque and/or thrust force produced by at least one of said effectors to decrease by an amount greater than 20%, 50%, or 80%, or herein the failure causes a complete loss of the torque and/or thrust force of at least one of said effectors.

Failures can be detected using a great variety of methods, including monitoring by a human; indirect detection such as monitoring measured data with an automatic method such as a model-based observer on or off-board the multicopter, or using sliding mode observers, voting-based algorithms, parity-space approaches, or parameter identification; direct detection of the failure e.g. by monitoring the rotational speed of a multicopter's motors, or by monitoring how much current a multicopter's motors draw; and others.

In the invention, it may furthermore be that said torque along said primary axis can cause said multicopter to rotate about said primary axis at a speed greater than 0.5 revolutions per second.

In the invention, it may furthermore be that said torque along said primary axis can cause said multicopter to rotate about said primary axis at a speed greater than 1 revolutions per second.

Preferably said torque along said primary axis can cause said multicopter to rotate continuously when the orientation of the primary axis has converged to the target orientation.

Preferably, said 0.5 or 1 revolutions per second are average rotational speeds during a predefined time interval.

Preferably, the target force is the sum of force of the remaining, failure-free effectors.

The method may further comprise the step of defining a target acceleration for said multicopter. Preferably said target acceleration is used to computer said target orientation of said primary axis for said multicopter. Preferably it additionally comprises the step of controlling one or more of said at least four effectors, and preferably additionally comprises the step of controlling said one or more effectors so that the thrust collectively produced by said one or more effectors accelerates said multicopter at said target acceleration.

The method may further comprise step of computing said target orientation of said primary axis using said target acceleration of said multicopter, using the equation $$\tilde{n} = \frac{(a-g)}{\|a-g\|}$$

wherein the vector a represents said target acceleration and the vector g represents the gravitational acceleration, and the vector ñ represents said target orientation, and $\|\cdot\|$ represents the Euclidean norm of a vector. In other words, the target orientation of said primary axis can be computed as the difference between the vector equalling said target acceleration and the vector of gravitational acceleration, divided by the Euclidean norm of that difference.

The method may further comprise the step of defining a target thrust force magnitude. Preferably said step of controlling one or more of said at least four effectors, based on said estimate of the orientation of the primary axis of said body with respect to the predefined reference frame and said estimate of the angular velocity of the multicopter comprises controlling said one or more effectors such that the magnitude of the sum of each of said thrust forces produced individually by said one or more effectors along said primary axis equals said target thrust force magnitude.

In the invention, the method may further comprise the step of defining a target thrust force magnitude. Preferably said step of controlling one or more of said at least four effectors based on said estimate of the orientation of the primary axis of said body with respect to the predefined reference frame and said estimate of the angular velocity of the multicopter comprises controlling said one or more effectors such that the magnitude of the sum of each of said thrust forces produced individually by said one or more effectors along said primary axis averaged over a predefined time period equals said target thrust force magnitude.

In the invention, the method may further comprise the step of controlling one or more of said at least four effectors, preferably comprising controlling each of said one or more of said at least four effectors to each contribute at least 20% to the target thrust force magnitude when the orientation of said primary axis has converged to said target orientation.

In the invention, the method may further comprise the step of computing said target thrust force magnitude using said target acceleration of said multicopter preferably comprising the steps of defining said target acceleration, computing said target thrust force magnitude as $$f_{des} = m\|a-g\|$$

wherein $f_{des}$ represents the target thrust force magnitude, $\|\cdot\|$ represents the Euclidean norm of a vector, a represents the said target acceleration, g represents the acceleration due to gravity and m represents the mass of said multicopter. In other words, the target thrust force magnitude can be computed as the mass of said multicopter times the Euclidean norm of the difference between the vector equaling said target acceleration and the vector of gravitational acceleration.

Said controlling the acceleration may, for example, allow to control the direction with which a multicopter collides with the ground following a severe failure that no longer allows the effectors to produce enough thrust to keep the multicopter airborne.

In the invention, the method may further comprise the steps of defining a target translational velocity of said multicopter, defining a target position of said multicopter, estimating the current translational velocity of said multicopter, estimating the current position of said multicopter; and using at least one of said target translational velocity, said target position, said current translational velocity and said current position of said multicopter, to compute said target acceleration.

Preferably the method uses the current translational velocity to compute said target acceleration.

Preferably the method uses the current position to compute said target acceleration.

Preferably, said method uses all of said target translational velocity, said target position, said current translational velocity and said current position of said multicopter to compute said target acceleration.

A preferable method for how these estimates could be used would be as follows. Let $v_{des}$ and $p_{des}$ represent the target velocity and position of the multicopter, respectively, and let v and p represent the estimates of the current velocity and current position of the multicopter, respectively, and define the target acceleration as $a_{des}$. If the multicopter tracks this target acceleration, the multicopter's position and velocity will converge to the target if the target acceleration is selected as follows:

$$a_{des} + 2\zeta\omega_n(v-v_{des}) + \omega_n^2(p-p_{des}),$$

wherein the parameter $\zeta$ represents a damping ratio, and $\omega_n$ represents a natural frequency, with both $\zeta$ and $\omega_n$ design parameters. A typical choice would be something similar to $\zeta=0.7$ and $\omega_n=2$ rad/s. Note that the above equation is just one method for parametrising the target acceleration in terms of the current and target position and velocity, with many others apparent to a person skilled in the arts, given the benefits of the present invention.

Said controlling the velocity may allow, for example, to minimize the energy of a multicopter when colliding with the ground following a severe failure that no longer allows the effectors to produce enough thrust to keep the multicopter airborne.

For example, by making the target position constant, and moving the multicopter to this position (e.g., by controlling its acceleration), the multicopter can be in a hover state, where 'hover' here is used to mean remaining substantially at one point in space.

Preferably, the multicopter is a quadrocopter. In the present application, a quadrocopter means a multicopter with four effectors, wherein each of said effectors is
  rigidly attached to a body of the multicopter,
  equipped with fixed-pitch propeller blades whose rotor pitch does not vary as the blades rotate,
  operable to produce both a torque and a thrust force, and
  structured and arranged to contribute a thrust force which can cause the multicopter to fly.

In the invention, it may furthermore be that each of said one or more effectors can individually produce a torque which has a non-zero component along said primary axis.

In the invention, said controlling may furthermore comprise controlling a single variable of a plurality of variables of each of one or more of said at least four effectors, wherein said plurality of variables comprises at least one of
  rotational speed,
  voltage,
  electric current,
  fuel flow,
  motor torque,
  mass flow,
  power.

Preferably, the single variable is a scalar value, e.g. a magnitude, and not a vector. Furthermore, said single variables can also be considered as signals such as effector control signals.

Preferably, the single variable sets both the thrust force and the torque, simultaneously.

Preferably, to cause the orientation of the primary axis to converge to a target orientation, and while the multicopter has an ongoing rotation about the primary axis, the multicopter body can be turned about a turning axis (preferably at a non-zero angle with respect to the primary axis). The effect of the two components of rotation, by Euler's equations of motion governing the evolution of the angular velocity of a rigid body, can preferably be exploited to create an angular acceleration (and thus velocity) linearly independent of the primary rotation as well as the rotation about the turning axis.

Therefore, even if the effectors can not produce sufficient torque in a direction perpendicular to the primary axis, the present invention allows to exploit this coupling effect inherent in the attitude dynamics to achieve full attitude control. This is particularly relevant and useful for the case of a multicopter with only one or two failure-free effectors.

In this present invention, attitude control means using a control unit to control the orientation of a primary axis of said multicopter.

For a propeller, a torque couple exists that produces a torque opposing the propeller's rotation, due to air resisting the motion of the propeller blades. This can contribute to the torque component in the direction of the primary axis.

In the invention, said controlling may furthermore comprise controlling at most three of said at least four effectors.

In the invention, said controlling may furthermore comprise controlling at most two of said at least four effectors.

In the invention, said controlling may furthermore comprise controlling at most one of said at least four effectors.

According to a further aspect of the present invention there is provided a multicopter, comprising (A) a body, (B) at least four effectors attached to the body, each operable to produce both a torque and a thrust force which can cause the multicopter to fly when not experiencing a failure, and a flight module configured such that it can carry out a method for operating said multicopter experiencing a failure during flight. The method may comprise the step of identifying a failure wherein the failure affects the torque and/or thrust force produced by an effector, and in response to identifying a failure carrying out the following steps, (1) computing an estimate of the orientation of a primary axis of said body with respect to a predefined reference frame, wherein said primary axis is an axis about which said multicopter rotates when flying, (2) computing an estimate of the angular velocity of said multicopter, (3) controlling one or more of said at least four effectors based on said estimate of the orientation of the primary axis of said body with respect to said predefined reference frame and said estimate of the angular velocity of the multicopter. The step of controlling one or more of said at least four effectors may be performed such that (a) said one or more effectors collectively produce a torque along said primary axis and a torque perpendicular to said primary axis, wherein (i) the torque along said primary axis causes said multicopter to rotate about said primary axis, and (ii) the torque perpendicular to said primary axis causes said multicopter to move such that the orientation of said primary axis converges to a target orientation with respect to said predefined reference frame, and (b) such that said one or more effectors individually produce a thrust force along said primary axis.

Preferably, the multicopter's flight module comprises (1) an input unit for receiving data from sensors and/or users, (2) a sensing unit for sensing the motion of said multicopter and/or the operation of at least one of said effectors, (3) an evaluation unit operationally connected to said sensing and/or input unit for identifying a failure affecting the torque and/or thrust force produced by one of said effectors, and (4) a control unit. Preferably, the control unit is configured to be operationally connected to said evaluation unit, and is configured to compute an estimate of the orientation of a primary axis of said body with respect to a predefined reference frame, wherein said primary axis is an axis about which said multicopter rotates when flying under the control of said control unit; and to send control signals to one or more of said effectors so that, (a) the said one or more effectors collectively produce a torque along said primary axis and a torque perpendicular to said primary axis, wherein (i) the torque along said primary axis causes said multicopter to rotate about said primary axis, and (ii) the torque perpendicular to said primary axis causes said multicopter to move such that the orientation of said primary axis converges to a target orientation with respect to said predefined reference frame, and (b) each of said one or more of said at least four effectors individually produce a thrust force along said primary axis.

Said evaluation unit may be configured to provide data representative of the motion of said multicopter, and may be operationally connected to said control unit to provide said data, and said control unit may be configured to perform controlling of said one or more effectors based on said results of said evaluation unit.

Said computation of the primary axis may be performed in dependence of data representative of the motion of said multicopter, and data representative of the physical characteristics of said multicopter.

Preferably, said data representative of the motion of the multicopter comprises at least one of an orientation of said multicopter, an angular velocity of said multicopter, an operational state of said effectors of said multicopter, an acceleration of said multicopter, a translational velocity of said multicopter or a position of said multicopter. Preferably said data representative of the physical characteristics of said multicopter comprises at least one of the moments of inertia, mass, dimensions, aerodynamic properties or effector properties. Said data representative of the physical characteristics are preferably stored on a memory unit. Said computation is preferably carried out on a microcontroller.

Preferably, said control unit can be configured to control said one or more effectors not affected by said failure such that each of said one or more effectors contribute at least 20% of the thrust collectively produced by said one or more effectors when the orientation of said primary axis has converged. Preferably, these one or more effectors are effectors not affected by said failure.

Preferably, said control unit may be configured to control said one or more effectors not affected by said failure such that each contribute at least 30% of the thrust collectively produced by said one or more effectors when the orientation of said primary axis has converged. Preferably, these one or more effectors are effectors not affected by said failure.

Preferably, the evaluation unit is operable to identify a failure, wherein the failure causes the torque and/or thrust force produced by at least one of the effectors to decrease by an amount greater than 20%.

Preferably, the evaluation unit is operable to identify a failure, wherein the failure causes the torque and/or thrust force produced by at least one of the effectors to decrease by an amount greater than 50%.

Preferably, the evaluation unit is operable to identify a failure, wherein the failure the torque and/or thrust force produced by at least one of the effectors to decrease by an amount greater than 80%.

Preferably, the evaluation unit is operable to identify a failure, wherein the failure causes a complete loss of the torque and/or thrust force produced by at least one of said effectors.

Preferably, the evaluation unit uses a microprocessor.

Preferably, the evaluation unit identifies the failure based on data representative of at least one of (a) one or more variables of a plurality of variables of the effector, wherein the plurality of variables of the effector comprises at least one of rotational speed, voltage, electric current, fuel flow, motor torque, mass flow, power; or (b) data representative of the motion of said multicopter, comprising an orientation of said multicopter, an angular velocity of said multicopter, an operational state of said effectors of said multicopter, an acceleration of said multicopter, a translational velocity of said multicopter or a position of said multicopter.

Said control unit may further be configured such that it can control at least one of said effectors such that said one or more effectors may collectively produce a torque along said primary axis to cause said multicopter to rotate about said primary axis at a speed greater than 0.5 revolutions per second.

Preferably, said control unit is configured such that it can control at least one of said effectors such that said one or more effectors may collectively produce a torque along said primary axis to cause said multicopter to rotate about said primary axis at a speed greater than 1 revolutions per second.

Preferably said torque along said primary axis can cause said multicopter to rotate continuously when the orientation of the primary axis has converged to the target orientation.

Preferably, said 0.5 or 1 revolutions per second are average rotational speeds during a predefined time interval.

Said control unit may further be configured to control a single variable of a plurality of variables of each of one or more of said at least four effectors, wherein said plurality of variables comprises at least one of
rotational speed,
voltage,
electric current,
fuel flow,
motor torque,
mass flow,
power.

Preferably, the multicopter, after experiencing a failure wherein the failure affects the torque and/or thrust force produced by an effector, comprises no more than is three effectors unaffected by said failure.

Preferably, the multicopter, after experiencing a failure wherein the failure affects the torque and/or thrust force produced by an effector, comprises no more than two effectors unaffected by said failure.

Preferably, the multicopter, after experiencing a failure wherein the failure affects the torque and/or thrust force produced by an effector, comprises no more than one effector unaffected by said failure.

Said control unit may be further configured (a) to define a target acceleration for said multicopter, and (b) to use said target acceleration to compute said target orientation of said primary axis for said multicopter, and (c) to send said control signals such that furthermore said at least four effectors are controlled such that the thrust collectively produced by said one or more effectors accelerates said multicopter at said target acceleration.

Preferably, said target acceleration can be freely selected at run time, preferably from a range or specified list target accelerations.

Preferably, said control unit is further configured to compute said target orientation of said primary axis using said target acceleration of said multicopter by computing said target orientation using the equation $$\tilde{n} = \frac{(a-g)}{\|a-g\|}$$

wherein the vector a represents said target acceleration and the vector g represents the gravitational acceleration, and the vector ñ represents said target orientation, and $\|\cdot\|$ represents the Euclidean norm of a vector. In other words, the target orientation of said primary axis can be computed as the difference between the vector equalling said target acceleration and the vector of gravitational acceleration, divided by the Euclidean norm of that difference.

Said control unit may further be configured to (a) define a target thrust force magnitude, and (b) send said control signals such that the magnitude of the sum of each of said thrust forces produced individually by said one or more effectors along said primary axis equals said target thrust force magnitude. Preferably, these thrust forces are produced by effectors not affected by said failure.

Said control unit may further be configured to (a) define a target thrust force magnitude, and (b) send said control signals such that the magnitude of the sum of each of said thrust forces produced individually by said one or more effectors along said primary axis over a predefined time period equals said target thrust force magnitude. Preferably, these thrust forces are produced by effectors not affected by said failure.

Preferably, said target thrust force magnitude can be freely selected at run time, preferably from a range or specified list of target thrust force magnitudes.

Said control unit may further be configured to compute said target thrust force magnitude using said target acceleration of said multicopter by (a) defining said target acceleration, and (b) computing said target thrust force magnitude as $$f_{des} = m\|a-g\|$$

wherein $f_{des}$ represents the target thrust force magnitude, $\|\cdot\|$ represents the Euclidean norm of a vector, a represents the said target acceleration, g represents the acceleration due to gravity and m represents the mass of said multicopter. In other words, the target thrust force magnitude can be computed as the mass of said multicopter times the Euclidean norm of the difference between the vector equalling said target acceleration and the vector of gravitational acceleration.

Said multicopter may further comprise a sensor which may be operationally connected to said sensing unit and configured to (a) detect data representative of the motion of the multicopter, and (b) provide said data representative of the motion of the multicopter to said sensing unit. Preferably, the sensor belongs to the group of inertial sensors, distance sensors, or rate sensors. Preferably, the sensor belongs to the group of accelerometers, gyroscopes, magnetometers, cameras, optical flow sensors, laser or sonar range finders, radar, barometers, thermometers, hygrometers, bumpers, chemical sensors, electromagnetic sensors, air flow sensors or relative airspeed sensors, ultra sound sensors, microphones, radio sensors, or other height, distance, or range sensors, or infra-red sensors.

Said multicopter may further comprise a sensor which is arranged to detect data representative of the operation of at least one of said effectors, and operationally connected to, and providing said data representative of the operation of at least one of said effectors, to said sensing unit.

Preferably, the sensor uses at least one of a single variable of a plurality of variables of the effector, wherein the plurality of variables of the effector comprises at least one of a rotational speed, a voltage, electric current, fuel flow, motor torque, mass flow, power.

Said control unit may be mechanically independent of said body and said at least four effectors, and operationally connected to the multicopter via a wireless connection. Such a wireless connection may consist of a WiFi connection, Bluetooth, ZigBee, or another type of radio connection. Alternatively, the connection could consist of an optical connection, e.g. consisting of infrared transmissions.

Preferably, said mechanically independent control unit is contained in a housing structured and arranged to be held in the hand of a user, and configured to receive input from said user via a user interface usable to control one or more of said at least four effectors of said multicopter via said wireless connection. Such a handheld device could be in the form of a smartphone, or a tablet computer device, or it could be in the form similar to traditional hobbyist remote controllers.

According to a further aspect of the present invention there is provided it control unit for a multicopter, the multicopter comprising: (1) a body, (2) at least four effectors attached to the body, each operable to produce both a torque and a thrust force which can cause the multicopter to fly when not experiencing a failure; and said control unit comprising a flight module configured such that it can carry out a method for operating said multicopter experiencing a failure during flight. The method may comprise the step of identifying a failure wherein the failure affects the torque and thrust force produced by an effector, and in response to identifying a failure carrying out the following steps, (1) computing an estimate of the orientation of a primary axis of said body with respect to a predefined reference frame, wherein said primary axis is an axis about which said multicopter rotates when flying, (2) computing an estimate of the angular velocity of said multicopter, (3) controlling one or more of said at least four effectors based on said estimate of the orientation of the primary axis of said body with respect to said predefined reference frame and said estimate of the angular velocity of the multicopter. The step of controlling one or more of said at least four effectors may be performed such that (a) said one or more effectors collectively produce a torque along said primary axis and a torque perpendicular to said primary axis, wherein (i) the torque along said primary axis causes said multicopter to rotate about said primary axis, and (ii) the torque perpendicular to said primary axis causes said multicopter to move such that the orientation of said primary axis converges to a target orientation with respect to said predefined reference frame, and (b) such that said one or more effectors individually produce a thrust force along said primary axis.

Preferably, the control unit's flight module comprises (1) an input unit for receiving data from sensors and/or users, (2) a sensing unit for sensing the motion of said multicopter and/or the operation of at least one of said effectors, (3) an evaluation unit operationally connected to said sensing and/or input unit for identifying a failure affecting the torque and/or thrust force produced by one of said effectors, and (4) a control unit. Preferably, the control unit is configured to be operationally connected to said evaluation unit, and is configured to compute all estimate of the orientation of a primary axis of said body with respect to a predefined reference frame, wherein said primary axis is an axis about which said multicopter rotates when flying under the control of said control unit; and to send control signals to one or more of said effectors so that, (a) the said one or more effectors collectively produce a torque along said primary axis and a torque perpendicular to said primary axis, wherein (i) the torque along said primary axis causes said multicopter to rotate about said primary axis, and (ii) the torque perpendicular to said primary axis causes said multicopter to move such that the orientation of said primary axis converges to a target orientation with respect to said predefined reference frame, and (b) each of said one or more of said at least four effectors individually produce a thrust force along said primary axis.

The control unit may be operationally connected to said evaluation unit, wherein said evaluation unit provides data representative of the motion of said multicopter, and provides said data to said control unit, and said control unit performs controlling of said one or more effectors based on said results of said evaluation unit.

The control unit may further be configured to compute a primary axis of said body, wherein (a) said primary axis is an axis about which said multicopter rotates when flying under the control of said control unit, and (b) each of said one or more effectors produces a thrust force along said primary axis, and wherein said computation of the primary axis is performed in dependence of data representative of the motion of said multicopter, and data representative of the physical characteristics of said multicopter.

Preferably, said data representative of the motion of the multicopter comprises at least one of an orientation of said multicopter, an angular velocity of said multicopter, an operational state of said effectors of said multicopter, an acceleration of said multicopter, a translational velocity of said multicopter or a position of said multicopter.

Preferably said data representative of the physical characteristics of said multicopter comprises at least one of the moments of inertia, mass, dimensions, aerodynamic properties or effector properties. Said data representative of the physical characteristics are preferably stored on a memory unit. Said computation is preferably carried out on a microcontroller.

According to yet another aspect of the present invention, there is provided the use of said control unit for a multicopter, the multicopter comprising (1) a body, (2) at least four effectors attached to the body, each operable to produce both a torque and a thrust force which can cause the multicopter to fly when not experiencing a failure; wherein said control unit comprises a flight module configured such that it can carry out a method for operating said multicopter experiencing a failure during flight. The method may comprise the step of identifying a failure wherein the failure affects the torque and/or thrust force produced by an effector, and in response to identifying a failure carrying out the following steps, (1) computing an estimate of the orientation of a primary axis of said body with respect to a predefined reference frame, wherein said primary axis is an axis about which said multicopter rotates when flying, (2) computing an estimate of the angular velocity of said multicopter, (3) controlling one or more of said at least four effectors based on said estimate of the orientation of the primary axis of said body with respect to said predefined reference frame and said estimate of the angular velocity of the multicopter. The step of controlling one or more of said at least four effectors may be performed such that (a) said one or more effectors collectively produce a torque along said primary axis and a torque perpendicular to said primary axis, wherein (i) the torque along said primary axis causes said multicopter to rotate about said primary axis, and (ii) the torque perpendicular to said primary axis causes said multicopter to move such that the orientation of said primary axis converges to a target orientation with respect to said predefined reference frame, and (b) such that said one or more effectors individually produce a thrust force along said primary axis.

Preferably, the control unit's flight module comprises (1) an input unit for receiving data from sensors and/or users, (2) a sensing unit for sensing the motion of said multicopter and/or the operation of at least one of said effectors, (3) an evaluation unit operationally connected to said sensing and/or input unit for identifying a failure affecting the torque and/or thrust force produced by one of said effectors, and (4) a control unit. Preferably, the control unit is configured to be operationally connected to said evaluation unit, and is configured to compute an estimate of the orientation of a primary axis of said body with respect to a predefined reference frame, wherein said primary axis is an axis about which said multicopter rotates when flying under the control of said control unit; and to send control signals to one or more of said effectors so that, (a) the said one or more effectors collectively produce a torque along said primary axis and a torque perpendicular to said primary axis, wherein (i) the torque along said primary axis causes said multicopter to rotate about said primary axis, and (ii) the torque perpendicular to said primary axis causes said multicopter to move such that the orientation of said primary axis converges to a target orientation with respect to said predefined reference frame, and (b) each of said one or more of said at least four effectors individually produce a thrust force along said primary axis.

Preferably, the failure affecting the torque and/or thrust force produced by one of said effectors causes said torque and/or thrust force to decrease by an amount greater than or equal to 20%, 50%, 80%, or 100%.

Other technical advantages of the present invention will be readily apparent to one skilled in the art from those following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the invention, reference is made to the following description and accompanying drawings, in which:

FIG. 5 shows a table with typical effector failures for a quadrocopter to illustrate the applicability of the present invention;

DETAILED DESCRIPTION

Figure 1:
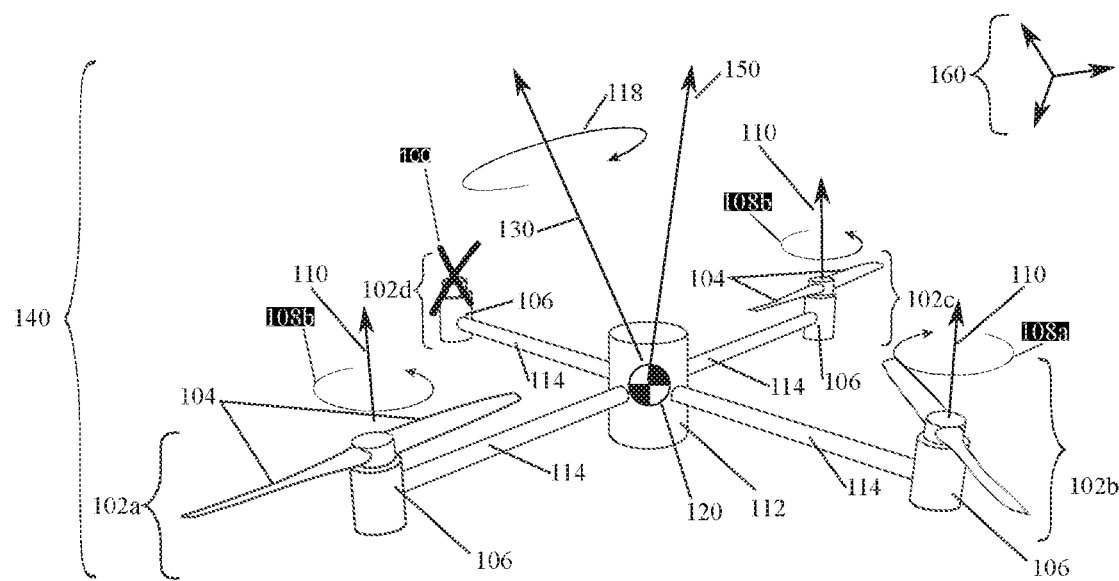
FIG. 1 shows a schematic of a first preferred embodiment of the invention, showing a quadrocopter experiencing a failure disabling a single effector, and nevertheless capable of controlled flight using the disclosed method.

The disclosed invention relates to the control of motion of multicopter experiencing a failure affecting one or more effectors. Multicopters are typically equipped with effectors that produce both a thrust force and a torque acting on the multicopter. These effectors are typically characterized by having a characteristic drive axis (typically identical to the direction of thrust force), which is fixed with respect to the body of the multicopter, and by having a single variable which controls the thrust force. For example, the fixed-pitch propellers used on many hover-capable aerial vehicles such as multicopters produce a thrust force and torque acting on the vehicle, and are typically directly fixed to a motor's fixed drive axis and commanded using a single variable. For multicopters, this single variable typically commands the relative desired speed of the motor and thus the thrust force of the effector. Multicopters typically use brushless motors, which typically use a motor controller to convert this single variable into amplitude, waveform, and frequency required to achieve a desired rotor speed. Such motor controllers typically contain 3 bi-directional outputs (i.e. frequency controlled three phase output), which are controlled by a logic circuit, but can have more complex implementations involving additional sensors and electronics to achieve high performance or other desirable properties. A hover-capable vehicle is a heavier-than-air flying vehicle that is able to approximately attain and maintain a position at a target point in space.

A defining characteristic of the present invention is that the disclosed control scheme results in a continuous rotation of the multicopter about a primary axis 130 defined in a coordinate system fixed with respect to the body of the multicopter and passing through its center of mass. On multicopters, effectors are arranged in such a way that in addition to providing a force along their drive axes, they also create a torque acting on the multicopter's center mass and with a component perpendicular to the primary axis 130.

To achieve and sustain this rotation of the multicopter about the primary axis 130, the effectors can further be made to produce a torque with a component in the direction of the primary axis 130. For a fixed-pitch propeller, the torque component can be achieved by placing the drive axis of the propeller parallel to the primary axis 130, and using the aerodynamic reaction drag torque acting to oppose the propeller's rotation (and thus acting in the direction of the primary axis 130).

In the present application failure affecting an effector means a partial or complete loss of torque and/or thrust force produced by the effector. Typically this loss is in the range of 20% to 100% of the nominal thrust. Overall, multicopters are comparably simple and hence comparably safe flying vehicles (the best system on an aircraft is the one that it doesn't have, because it can never fail). However, due to their enormous popularity, a very large number of multicopter crashes are documented in the literature. The vast majority of all multicopter crashes are due to effector failure—apart from pilot errors that result in a collision of the multicopter with an obstacle, the multicopter typically stays airborne as long as effectors do not fail at producing thrust in a controlled way. The present invention may therefore allow to overcome or limit the consequences of the vast majority of all multicopter crashes, including some that involve collisions with an obstacle. The most common multicopter failures in the literature are:

1. Failures due to collisions with obstacles due to piloting errors or wind or turbulence. For example, during an inspection operation a sudden gust of wind pushes a multicopter into a bridge, resulting in an effector failure due to a broken propeller, and subsequent catastrophic loss of control and crash.
2. Failures of a multicopter's wiring. Examples of very common failures include:
   Unplugging of a motor connector due to vibrations.
   Detachment of a soldered wire.
   Loose wire cut by a propeller.

Wire ripped off by partial motor attachment failure (shaking loose of fastening screw or material fatigue of assembly).

Insufficient wire size and resulting overheating/melting of wire or solder attachment point.

3. Failures of a multicopter's propeller attachment, motor attachment or frame. The most common failures include:

Loose screws and bolts (loosened by vibrations, assembly errors, wear-and-tear, material fatigue).

Propellers attached in wrong configuration (counter-clockwise (sometimes called "puller" propellers) and clockwise propellers (sometimes called "pusher" propellers)).

Overtightening of attachment screws.

Undertightening of attachment screws.

4. Failures to properly balance all motors, to properly balance all propellers, and failures due to bent motor collets and shafts. This category is a main cause of vibrations and subsequent dislodging of parts, especially on larger multicopters.
5. Failures of a multicopter's motor. The most common failures result from overloading of motors (e.g., too large propellers) and subsequent overheating or operation in dust or sand.
6. Failures of a multicopter's electrical or electronic components. The most common failure in this category is flight in wet conditions such as rain, fog, or high humidity.
7. Failures of a multicopter's flight software. For example, improper programming of the flight control computer or improper motor gains for the aircraft weight.
8. Failures caused by improper remote control configurations, in particular reversed or improperly configured transmitter channels, or failure to ensure a strong enough signal between base station and receiver.
9. Failures caused by interference, most commonly interference between the electronic speed controls (also called "motor controller") with the multicopter's receivers.
10. Failures due to bad payloads.
11. failures due to a lack of or faulty sensor calibration.
12. Failures of a propeller due to material fatigue (e.g., fatigue cracks or stress fractures).

While not all of the above failures directly result in an effector failure, many result in flight configurations that can be controlled using the present invention. In particular, following one of the above failures, the present invention may allow to prevent a multicopter crash in spite of a loss of thrust by controlling the remaining effectors such that the multicopter enters a substantial continuous rotation around a primary axis 130, and by using the method disclosed herein to attain or maintain an orientation this primary axis 130 into a favourable direction, allowing for a controlled descent and landing.

Various methods can be used to detect that a failure has occurred. Examples include having a pilot who monitors the multicopter, and who can send a signal to the multicopter when a failure is observed, which then causes the multicopter to use the present invention to control the multicopter. Alternatively, the detection can be automatic, for example by having a model-based observer on the multicopter monitoring measured data and probabilistically detecting that an error has been observed (utilising, for example, a bank of Kalman filters where each represents a different failure mode). Sliding mode observers, voting-based algorithms, parity-space approaches, and parameter identification can also be used. The failure might also be detected directly, e.g. by monitoring the rotational speed of a multicopter's motors or by monitoring how much current a multicopter's motors draw.

Some failure detection methods might detect a failure only a certain time after it has occurred, meaning that the multicopter might be in a state far from the intended when the failure is recognised. Certain events, such as a collision with an obstacle, will also tend to put the multicopter in a state far away from the expected. Nonetheless the disclosed invention will allow the multicopter to recover from an arbitrary initial state. Depending on the specific multicopter configuration (such as mass, remaining effectors unaffected by the failure, etc.) the multicopter might be able to return to a hover after the failure, or finely move around space. Alternatively, instead of controlling the position, the disclosed invention could be used simply to reorient the multicopter after a failure, such that it (e.g.) hits the ground in a favourable way.

The invention may also offer the possibility of reducing the severity of pilot error. For example, if a pilot of a quadrocopter were to accidentally collide the quadrocopter with a structure, and thereby damage one of the propellers, an automated system could detect that a failure has occurred, and that some of the multicopter's effectors have been affected by a failure. The system could then automatically engage an internal autopilot, utilising available sensors to bring the multicopter to a hover, or to bring the multicopter to a soft landing on the ground.

FIG. 1 shows an exemplary arrangement of a preferred embodiment for a quadrocopter 140 with three remaining working effectors 102, and one effector disabled by a failure 100, each effector in the form of a fixed-pitch propeller 104 driven by a motor 106. The multicopter 140 consists of effectors 102 and a body 112 comprising a mechanical structure 114. The mechanical structure 114 and multicopter body 112 also house sensors, cabling, electronics, and other components of the multicopter (none shown). The multicopter's center of mass 120 is marked with a bi-colored circle. The propellers 104 spin about parallel drive axes of rotation 110, with the aerodynamic reaction drag torque of the propellers 104 resulting in a continuous rotation 118 of the entire multicopter body 112 about a primary axis 130. Two of the working propellers spin in one direction 108$b$, while the third spins in the opposite direction 108$a$. Although uncontrollable using the standard multicopter control method as known in the prior art, the disclosed invention can be applied to still control the multicopter, by causing it to spin about a primary axis 130 and controlling the orientation of this primary axis in a predefined reference frame 160. The figure also shows a target orientation of the primary axis 150, and a predefined reference frame 160. The effectors 102 are individually numbered one 102$a$, two 102$b$, three 102$c$ and four 102$d$ for convenience.

The orientation of the primary axis is typically estimated using an algorithm, allowing the calculation of an estimate of the orientation of the primary axis 150. Similarly, an estimate of the angular velocity of the multicopter can be computed. Examples of algorithms to compute these estimates include Kalman filters and Luenberger observers. The location of the multicopter in space is described by a position and translational velocity, typically defined in a predefined reference frame 160 and referred to some fixed point. Examples of a predefined reference frame 160 would be a 'East-North-Up' frame, with the origin fixed to some landmark. An estimate of the position, and an estimate of the translational velocity, of the multicopter can be computed by an algorithm similar to that of the orientation and angular velocity.

The motion of a flying vehicle is usually described by referring to an inertial reference frame. By neglecting the rotation of the Earth about its own axis, and about the sun, and the sun's rotation through the milky way, an Earth-fixed frame can be used as an approximation for an inertia reference frame. Thus, an Earth-fixed reference frame can be constructed by letting a first axis point from West to East, a second axis point South to North, and the final axis pointing from the center of the earth upward. Such a frame has proven to be a good approximation for objects moving at low speeds and over short distances. For greater accuracy, frames can be constructed with one direction pointing from the sun's center of gravity in a direction normal to the ecliptic plane (the plane through which the earth's center of mass moves as it rotates about the sun), and a second direction pointing to the First Point of Aries (or the vernal equinox), with the third direction in following from the right hand rule.

The operator of the multicopter often has some higher level goal, which can be translated into a target acceleration for the multicopter, or a target translational velocity, or a target position. Furthermore, some goals might be translated into a target thrust force magnitude, where this is the desired total force produced by the multicopter's effectors.

Figure 2:
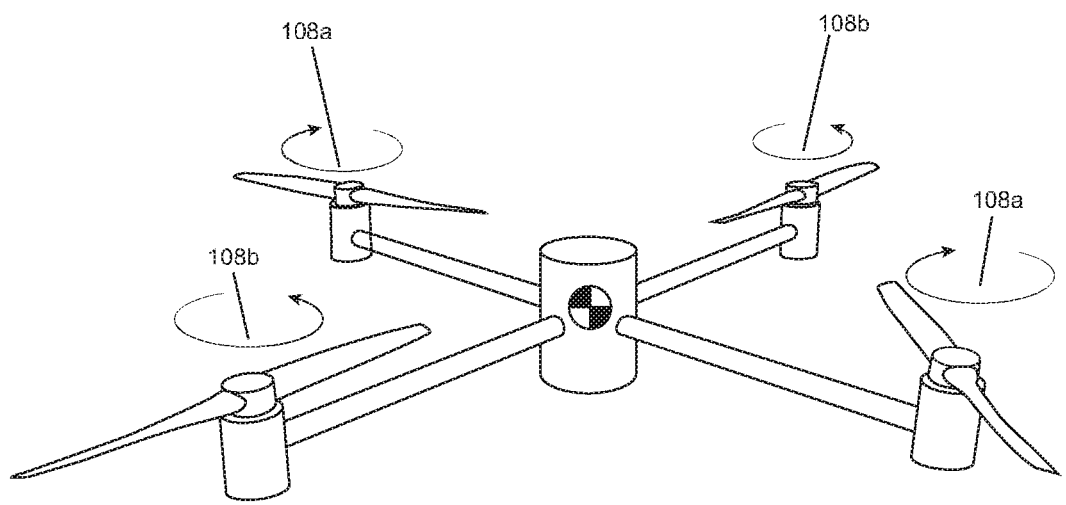
FIG. 2 shows a schematic of a failure-free quadrocopter as known in the prior art.

FIG. 2 shows a failure-free quadrocopter as known in the prior art, with two pairs of rigidly attached, fixed-pitch propellers, one pair 108a rotating in the clockwise direction and the other pair 108b counterclockwise. Propellers typically have two, three, or four blades and are sometimes also called "rotary wings" or "rotors" and defined to also include all rotating parts of a motor used to move them. Multicopters are hover-capable multicopters with multiple propellers. Typical arrangements use four, six, or eight propellers, which are commonly referred to as quadrocopters, hexacopters, and octocopters, respectively, and are well known in the prior art and widely used. However, many variations including 16 and more propellers arranged in many configurations (e.g., with aligned as well as inclined or inverted axes; arranged individually or contra-rotating; exposed or encased in ducts or protective shrouds) are in use. Multicopters typically use fixed-pitch blades whose rotor pitch does not vary as the blades rotate for mechanical simplicity. This mechanical simplicity and the resulting ease of construction, combined with high agility and the ability to maintain position (hover) make multicopters the platform of choice for many aerial applications.

Multicopter motion is typically controlled via control signals sent to the multicopter's effectors to vary the relative speed of each propeller to change the thrust and torque. The relative speed of each propeller is typically set using a single variable, which is translated into control signals by a motor controller. Translational motion in the direction of thrust of the four propellers (sometimes "total thrust" or "collective thrust") is controlled by changing the individual thrusts of each of the propellers to achieve the target total force. Independent of the collective thrust, rotation about the direction of the total thrust (usually called "yaw") is controlled by spinning up either the clockwise or the counter-clockwise propellers while respectively slowing down the other propellers, thereby producing a torque produced by the difference of drag effects between the propellers rotating clockwise and the propellers rotating counter-clockwise. Independently of the above, rotation about the other axes is controlled by using thrust difference between opposite propellers, while maintaining the independent relationships described above to control yaw and total thrust as desired. In total, four independent motion properties ("degrees of freedom") of the multicopter, one translational and three rotational, are thus independently controlled by appropriately modulating the thrusts produced by the propellers. With some minor variation, this principle of operation typically applies to all commonly used multicopter vehicles. Full translational control is then achieved by orienting the total force in the direction of desired translational motion.

Figure 3:
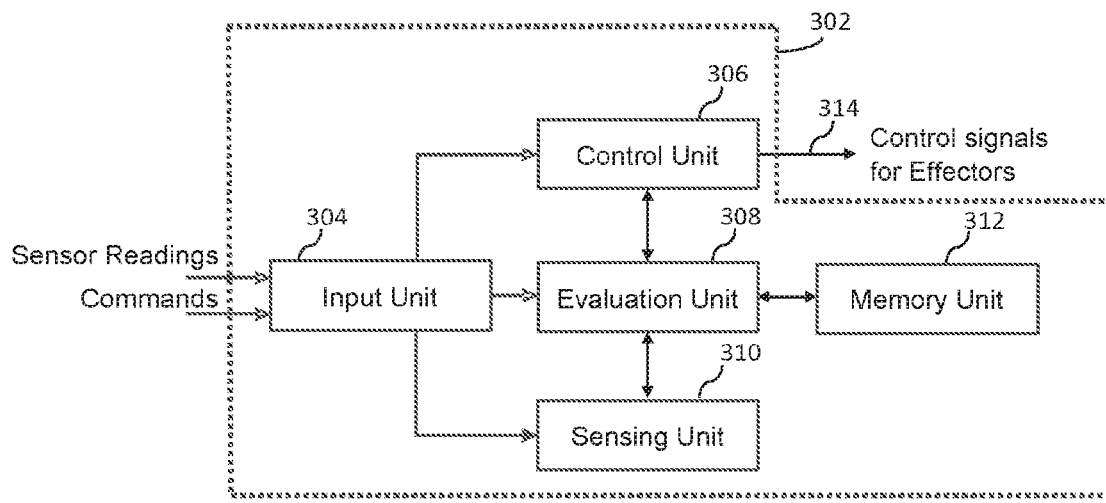
FIG. 3 shows a block diagram of a flight module and its parts.

FIG. 3 shows an example of a flight module for a multicopter that can be used as part of the disclosed control scheme. For multicopters, such a flight module is typically implemented on-board or both on-board and off-board (e.g., with a control unit 306 directly connected with the on-board motors but also receiving inputs via an input unit 304 from off-board sensors via an off-board sensing unit 310 such as a camera tracking system). Flight modules are typically used to process vehicle inputs (e.g., user commands, sensor readings) and to compute outputs (e.g., control signal for effectors 314). For example, they allow active self-stabilization by generating control outputs for the flight effectors (e.g. the propellers 104) as well as for any other effectors or actuators. In multicopters, flight modules are used in various operating modes including remote control by an operator with a direct line of sight to the multicopter; controlled remotely by relaying sensor data to a pilot and relaying control signals back to the multicopter (sometimes referred to as "telepresence"); or in partial or fully autonomous modes of operation.

Flight modules typically receive high inputs in the form of goals or commands from a user, base station, command center, or high level control algorithm via, an input unit 304 and passed on to a control unit 306, evaluation unit 308, and sensing unit 310. Control units 306 are typically used to generate control signals for a multicopter's effectors. Evaluation units 308 are typically used to evaluate data from input units 304, sensing units 310, and memory units 312. Such data may be representative of user commands or high level commands as well as both relative or absolute position, particularly that of GPS sensors, visual odometry/SLAM, retro-reflective positioning systems, laser range finders, WiFi positioning systems, barometric altimeters and variometers, or ultra-sound sensors (none shown). Sensor data may be gathered and preprocessed using a sensor unit 310 or stored in a memory unit 312. Typical examples of processed information are those received from sensors, such as accelerometers, gyroscopes, magnetometers, cameras, optical flow sensors, laser or sonar range finders, radar, barometers, thermometers, hygrometers, bumpers, chemical sensors, electromagnetic sensors, air flow sensors, or microphones (none shown). Memory units 312 are typically used to store data. For example, they may be used to store data on past sensor readings, operational states or user commands, as well as properties of the multicopter.

All of the above units may be implemented on a single circuit board, on a single board computer, or on a single microcontroller.

Depending on the application, flight modules may be far more complex than the simple block diagram shown in FIG. 3 and may, in particular, comprise multiple input units 304, control units 300, evaluation units 308, sensing units 310, and memory units 312 arranged in a single block 302 or multiple blocks.

FIG. 4(A) shows a quadrocopter with two opposing effectors disabled due to a failure 100, and two remaining, working, effectors spinning in the same sense 108b. During hover operation and utilising the present invention, the forces and torques create a continuous rotation of the multicopter body about the primary axis 130. A coordinate system is defined fixed with respect to the multicopter's body, consisting of the directions x, y and z, where z is chosen for this case such that it coincides with the primary axis 130, and x lies perpendicular to z and points from the center of mass 120 to the first effector. y follows from the right-hand-rule. The three instantaneous rates of rotation for the multicopter, p, q, r are defined about the multicopter body-fixed axes x, y, z, respectively.

As illustrated, the multicopter body has an instantaneous angular velocity $\omega^B$, that is nominally aligned with the primary axis 130, but may deviate in direction and magnitude during corrective or commanded motion.

The rotation of this body fixed frame with respect to some inertial coordinate frame is described by the rotation matrix R, governed by the differential equation $$\dot{R} = R[[\omega^B \times]] \tag{1}$$

where $\omega^B = (p, q, r)$ is the angular velocity of the multicopter as shown with its components in FIG. 4(D), expressed in the coordinate system fixed to the multicopter body, and $[[\omega^B \times]]$ is the matrix form of the cross product, such that $$[[\omega^R \times]] = \begin{bmatrix} 0 & -r & q \\ r & 0 & -p \\ -q & p & 0 \end{bmatrix}. \tag{2}$$

The orientation, or direction, z of the primary axis 130 in the inertial coordinate frame, can be expressed as $$z = R^T \begin{bmatrix} 0 \\ 0 \\ 1 \end{bmatrix}, \tag{3}$$

such that the differential equation of the orientation can be found with (1):

$$\dot{z} = R \begin{bmatrix} 0 & -r & q \\ r & 0 & -p \\ -q & p & 0 \end{bmatrix} \begin{bmatrix} 0 \\ 0 \\ 1 \end{bmatrix} = R \begin{bmatrix} q \\ -p \\ 0 \end{bmatrix}. \tag{4}$$

From this follows that the primary axis 130 can be made to achieve a commanded orientation if the angular velocity components p and q can be controlled, and will maintain an orientation if the components p and q are zero.

Each effector i has a single commandable degree of freedom (here also referred to as a single variable), and produces a thrust force vector $f_{T_i}$ (FIG. 4(C)) and a torque vector $\tau_i$ about the multicopter's center of mass 120 (FIG. 4(B)), where the torque vector consists of the moment of the thrust force vector and includes aerodynamic reaction drag torque acting to oppose the propeller's rotation. Additionally, the multicopter's weight mg acts on the multicopter, and there exists an aerodynamic drag torque $\tau_d$ acting to oppose the multicopter's angular velocity.

The differential equation governing the evolution the angular velocity of a body with rotating effectors is given by $$I^B \dot{\omega}^B = \sum_j \tau_j - [[\omega^B \times]] \left( I^B \omega^B + \sum_i I^{R_i} (\omega^B + \omega^{R_i}) \right). \tag{5}$$

where $\omega^{R_i}$ is the rotation rate vector of effector i, $I^B$ is the inertia matrix of the multicopter body, expressed in the body-fixed coordinate system; $I^{R_i}$ is the inertia matrix of effector i; and $\tau_j$ includes the torque vector of each rotor i acting through the multicopter's center of mass 120, and any other torques acting on the multicopter (such as aerodynamic drag torque on the multicopter). Note that the inertia of the body is taken to include any components rigidly attached to the body, such as the multicopter structure, control units, sensors.

The left side of (5) contains the angular accelerations $\dot{p}$, $\dot{q}$; where control of these components allows the control of the orientation of the primary axis through (4). The first term of the right side of (5) is the sum of all the torques acting on the multicopter. The remaining term of (5) expresses the cross coupling of the angular momentum in the system, due to taking the derivative in a non-inertial frame.

FIG. 4(B) shows the torque vectors $\tau_i$ produced by each of the two remaining rotors on the multicopter center of mass 120, and their components perpendicular to the primary axis 130.

FIG. 4(C) shows the thrust force vectors $f_{T_i}$ produced by each of two remaining rotors on the multicopter's center of mass 120, and their components acting in the direction of the primary axis 130. The figure also shows the weight of the multicopter mg. By orienting the multicopter's primary axis 130, and through the sum of the propeller's thrust force vectors, a total force is achieved. This total force can be oriented in a target direction by the mechanism of orienting the primary axis 130 as described above.

The translational acceleration is related to the total forces through Newton's second law. Thus a translational acceleration of the multicopter can be effected through the total force, while this acceleration, in turn, allows to effect a translational velocity, which in turn allows to effect a change in the position of the multicopter. For the sake of clarity of exposition, the following assumptions about the system are made for the derivation. Note that these assumptions are reasonable for the derivation of control schemes for practical multicopter configurations, and lead to practical and applicable control schemes.

The mass distribution of the multicopter body is such that the principle axes of inertia coincide with x, y and z, such that the inertia matrix $I^B$ is diagonal, with the components $$I^B = \begin{bmatrix} I_X^B & 0 & 0 \\ 0 & I_Y^B & 0 \\ 0 & 0 & I_Z^B \end{bmatrix}. \tag{6}$$

The effectors are propellers, mounted along the x axis of the body, each at a distance of l from the multicopter's center of mass 120.

The effectors are identical propellers, have a mass negligible when compared to that of the quadrocopter, have a diagonal inertia matrix $I^R$ whose magnitude is negligible compared to that of the multicopter body, and rotate around axes parallel to the primary axis 130.

$$I^R = \begin{bmatrix} I_X^R & 0 & 0 \\ 0 & I_Y^R & 0 \\ 0 & 0 & I_Z^R \end{bmatrix} \tag{7}$$

The magnitude of the angular velocity of the multicopter body is negligible when compared to the magnitude of the angular velocity of either propeller.

The force vectors produced by the propellers $f_{T_i}$ are parallel, and parallel to the multicopter primary axis 130 as illustrated in FIG. 4(C), such that they can be expressed in the body-fixed coordinate frame as $$f_{T_i} = \begin{bmatrix} 0 \\ 0 \\ f_{T_i} \end{bmatrix} \quad (8)$$

(note the distinction between vector $f_{T_i}$ and the scalar $f_{T_i}$). The only other force assumed to act on the multicopter is its weight mg.

The components of the torque vectors produced by the propellers, acting through the multicopter's center of mass 120 and perpendicular to the primary axis 130, are colinear with and parallel to y as illustrated in FIG. 4(B). It is assumed that the component acting perpendicular to the primary axis 130 is exclusively due to the moment of the propeller's thrust vector force $f_{T_i}$ acting at the distance l from the center of mass 120, and that there is no torque component in the direction of x. The component of the torque parallel to the primary axis 130 is $\|_{i\|}$ and is caused by the aerodynamic reaction drag torque to oppose the rotation of the propeller. Thus the propellers' torque vectors expressed in the body fixed frame are:

$$\tau_1 = \begin{bmatrix} 0 \\ -lf_{T_1} \\ \tau_{1\|} \end{bmatrix}, \tau_3 = \begin{bmatrix} 0 \\ lf_{T_3} \\ \tau_{3\|} \end{bmatrix}. \quad (9)$$

The components of the aerodynamic drag torque $\tau_d$ acting to oppose the multicopter's sense of rotation will be assumed to act only parallel to z, such that $\tau_d=(0, 0, -\tau_d)$ (note the distinction between the vector $\tau_d$ and the scalar $\tau_d$).

Denoting again the rotation of the body-fixed frame with respect some inertial predefined reference frame 160 with R and the angular velocity of the body with $\omega^B$, the differential equation of R is as in (1). The orientation of the multicopter is again described by (3), with associated differential equation given by (4).

Referring to (5), the angular velocity of rotor i with respect to the multicopter body, and expressed in the body-fixed frame, is $\omega^{H_i}=(0, 0, \omega^{R_i})$ (note again the distinction between the vector $\omega^{R_i}$ scalar $\omega^{R_i}$).

The left hand side of (5) contains the angular acceleration, and simplifies to $$I^B \dot{\omega}^B = \begin{bmatrix} I_X^B \dot{p} \\ I_Y^B \dot{q} \\ I_Z^B \dot{r} \end{bmatrix}. \quad (10)$$

The orientation of the multicopter is to be controlled through the angular velocity components p and q The sum of all torques, the first term on the right hand side, contains the propellers' torque vectors and the aerodynamic drag torque opposing the multicopter's sense of rotation, and yields $$\sum_j \tau_j = \begin{bmatrix} 0 \\ l(-f_{T_1} + f_{T_3}) \\ -\tau_d + \tau_{1\|} + \tau_{3\|} \end{bmatrix}. \quad (11)$$

The final term of (5) expresses the cross coupling of the angular momentum in the system, due to taking the derivative in a non-inertial frame Multiplying out the term, adding the components, and under the previous assumptions given yields $$[\omega^B \times]\left(I^B \omega^B + \sum_{i=\{1,3\}} I^R(\omega^B + \omega^{R_i})\right) \approx \quad (12)$$

$$\dots \begin{bmatrix} (I_Z^B - I_Y^B)qr + I_Z^R(\omega^{R_1} + \omega^{R_3})q \\ -(I_Z^B - I_X^B)pr - I_Z^R(\omega^{R_1} + \omega^{R_3})p \\ (I_Y^B - I_X^B)pq \end{bmatrix}$$

From the above, writing out (5) in its components yields the three scalar differential equations $$I_X^B \dot{p} = ((I_Y^B - I_Z^B)r - I_Z^R(\omega^{R_1} + \omega^{R_3}))q \quad (13)$$

$$I_Y^B \dot{q} = ((I_Z^B - I_X^B)r + I_Z^R(\omega^{R_1} + \omega^{R_3}))p + \dots (-f_{T_1} + f_{T_3})l \quad (14)$$

$$I_Z^B \dot{r} = (I_X^B - I_Y^B)pq + \tau_{1\|} + \tau_{3\|} - \tau_d. \quad (15)$$

From this can be seen that sending control signals to the propellers allows to directly effect an angular acceleration $\dot{q}$ about x. Because it has a component perpendicular to the primary axis 130, this directly produced angular acceleration is linearly independent of the primary axis 130. Furthermore, through the above mentioned angular to acceleration $\dot{q}$, an angular velocity q can be achieved.

Thus, by turning the body through a secondary axis lying along y, the multicopter's angular velocity components about the primary axis 130 (r) and the secondary axis (q) will interact to produce an angular acceleration (and thus a turning) about a turning axis, here x. Important to note is that the secondary axis lies at a non-zero angle with respect to the primary axis 130 (i.e. is linearly independent of the primary axis 130), and that the turning axis lies at a non-zero angle to both the primary and secondary axes (i.e. the turning axis is linearly independent of both). Concretely, for this multicopter, this means that although the rotors can not produce a torque about the x axis, the component p of angular velocity lying along x can be affected, and the primary axis' 130 orientation with respect to an inertial frame can be controlled. Similarly, for other multicopters, this means that the above effect can be actively exploited for their control rather than counteracted or otherwise compensated for.

Furthermore, this orientation can be maintained by bringing the angular velocity components p and q to zero, and commanding the propellers such that $f_{T_1}=f_{T_3}$ such that $\dot{p}=0$ and $\dot{q}=0$ by (13) and (14), respectively. The multicopter's angular velocity will then point along the primary axis 130 and the orientation will be constant.

The component of the multicopter's angular velocity along the primary axis 130, r, will be dominated by the torques $\tau_{i\|}$ and the drag torque $\tau_d$. Since the drag torque will typically monotonically increase with r, there will be an imbalance in $\tau_{1\|}+\tau_{3\|}-\tau_d$ at low speeds, such that the multicopter will increase this component of angular velocity, and thus the multicopter has a natural tendency to rotate about the primary axis 130. For fixed pitch propellers, there is typically a strongly linear relationship between the magnitude of the thrust force $f_{T_i}$ and the aerodynamic reaction drag torque $\tau_{i\parallel}$.

A translational acceleration of the multicopter can now be effected, by using the difference of the two forces $f_{T_1}$ and $f_{T_3}$ to attain and maintain an orientation of the primary axis, and using the sum of the two propeller thrust forces to achieve a resultant force acting on the body. Specifically, a target thrust force magnitude can be achieved with $f_{T_1}$ and $f_{T_2}$.

Note that while the above derivation was made under specific assumptions, these assumptions are reasonable for the derivation of control schemes for practical multicopter configurations and lead to practical and applicable control schemes. The above results, therefore, hold for a broader range of circumstances and should be interpreted as such.

The above derivation may be repeated for vehicle's which have off-diagonal terms in the inertia matrices. In this case the algebra is more complicated, but the resulting equations are similar. Likewise, the inertia of the propellers may be comparable to the inertia of the body, or the speed of the propellers comparable to the speed of the body.

Furthermore, given the benefits of the present invention it will be readily apparent to one skilled in the art that the specific control law used can vary, and can be derived using linear methods such as the linear quadratic regulator (LQR), using pole placement, various robust control methods, or nonlinear control methods.

FIG. 5 shows examples of effectors disabled due to a failure 100 for a standard quadrocopter, with all propellers having parallel axes of rotation, and with propellers opposing one another having the same sense of rotation, and adjacent propellers having the opposite senses of rotation. Effectors disabled due to a failure are indicated by a large "X" above the concerned effector. Standard multicopter control methods can not control a multicopter having a failed propeller as they are then no longer able to independently produce angular accelerations in all axes.

FIG. 5(*a*) shows a quadrocopter with a single propeller completely disabled by failure. Multicopter control can be regained by applying the disclosed method, but the multicopter is not controllable using standard multicopter control.

FIG. 5(*b*) shows a quadrocopter with two opposing propellers completely disabled by a failure. Multicopter control can be regained by applying the disclosed method, but the multicopter is not controllable using standard multicopter control.

FIG. 5(*c*) shows a quadrocopter with two adjacent propellers disabled due to a failure. Multicopter control can be regained by applying the disclosed method, but the multicopter is not controllable using standard multicopter control.

FIG. 5(*d*) shows a quadrocopter with three propellers disabled due to a failure. Multicopter control can be regained by applying the disclosed method, but the multicopter is not controllable using standard multicopter control.

Figure 7:
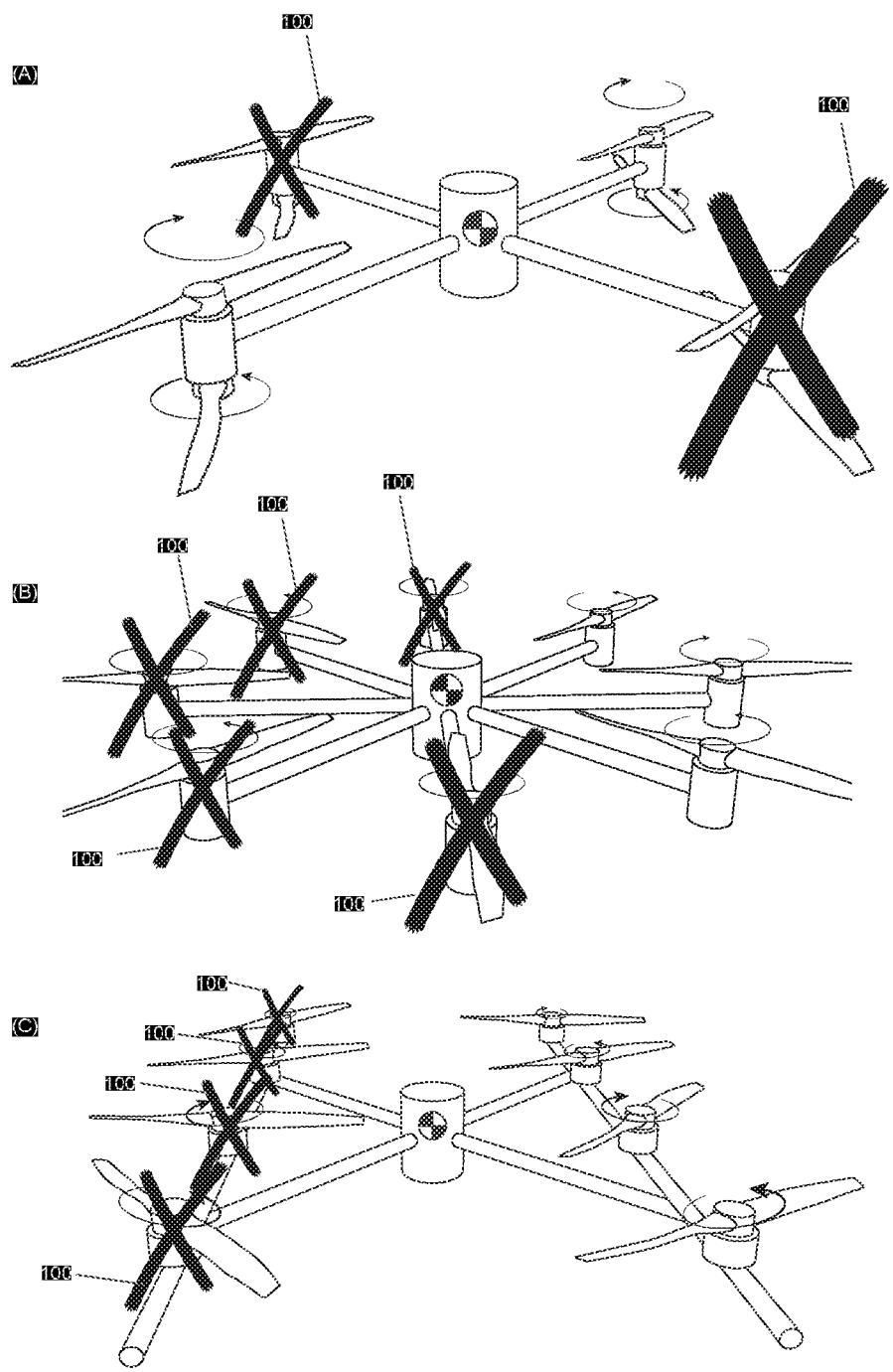
FIG. 7 shows schematics of three alternative multicopters experiencing various effector failures, where each resulting configuration can be controlled using the disclosed control method.

FIG. 7(*e*) shows a quadrocopter with four propellers disabled due to a failure. The quadrocopter is not controllable.

Exemplary Control Architecture

Figure 6:
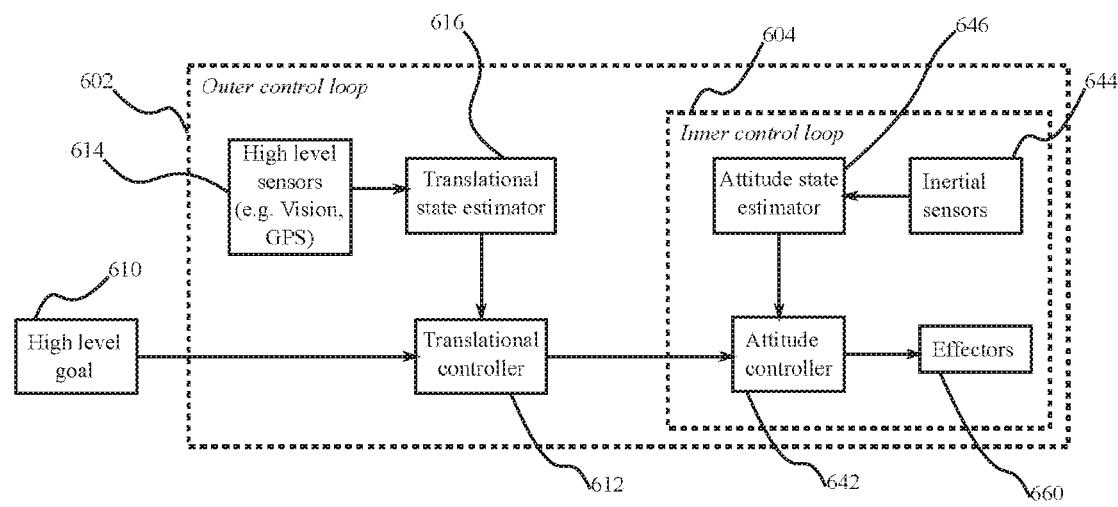
FIG. 6 shows a block diagram for explaining an exemplary control architecture that can be used with the present invention.

FIG. 6 shows an exemplary implementation of the disclosed method on a flying multicopter, where the method is broken down into an outer 602 and an inner 604 control loop. Other implementations of the disclosed method will be apparent to those skilled in the arts. A high level goal 610 is given by a user and is sent to a translational controller 612. High level sensors 614, such as GPS sensors and onboard vision systems send measurements to a translational state estimator 616, which estimates the multicopter's translational state and sends this estimate to the translational controller. The translational controller generates a target translational acceleration of the body in order to achieve the high level goal.

An attitude controller 642 receives this target translational acceleration, and sends control signals to each of the propellers 660. This attitude controller 642 computes a target orientation of the multicopter's primary axis 150 and a total commanded force that results in the target acceleration; then using the disclosed method, to generate a control signal for each propeller. Sensor measurements are passed to a state estimator 646 which estimates the multicopter's rotation and angular velocity and sends these estimates to the attitude controller. The sensor measurements are obtained from inertial sensors 644, which may include accelerometers, rate gyroscopes. Further examples of onboard sensors may include visual sensors such as cameras, range sensors, height sensors and relative airspeed sensors.

FIG. 7 shows alternative layouts of multicopters, with various effectors disabled due to failures, all of which are still controllable by using the disclosed invention. Specifically, FIG. 7(A) shows a multicopter with eight effectors, arranged in pairs of two, where two opposing pairs of effectors have completely failed, and wherein the resulting configuration is still controllable using the disclosed invention. FIG. 7(B) shows a multicopter with eight effectors, arranged symmetrically about the centre of mass and with alternating senses of rotation, where five adjacent effectors have completely failed, and wherein the resulting configuration is still controllable using the disclosed invention. FIG. 7(C) shows a multicopter with eight effectors, arranged in an H-configuration with four effectors on each side, where all four of the effectors on one side have completely failed, and wherein the resulting configuration is still controllable using the disclosed invention.

Figure 8:
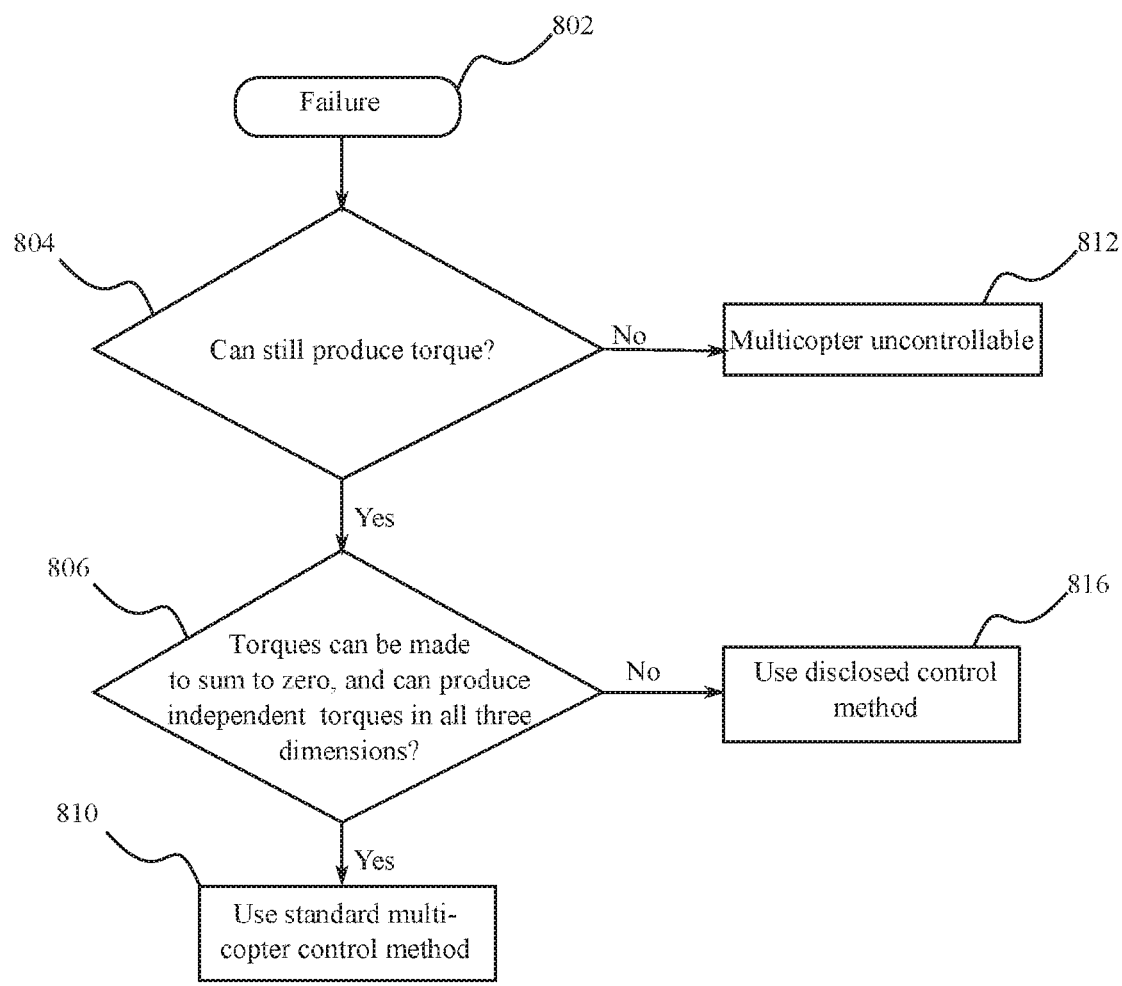
FIG. 8 shows a flowchart for deciding on a suitable control method in case of effector failure.

FIG. 8 shows an exemplary flowchart for deciding control method in case of a failure on a multicopter. After a failure 802, the system checks whether it can still produce torques 804. If it cannot, the multicopter is uncontrollable 812. If, however, the multicopter can produce torque, and all torques acting on the body can be made to sum to zero and furthermore torques can be produced in three independent directions 806, then the multicopter can be controlled using the standard multicopter control method as known in the prior art. If the standard multicopter control method cannot be used, then the multicopter can still be controlled with the disclosed invention 816.

Figure 9:
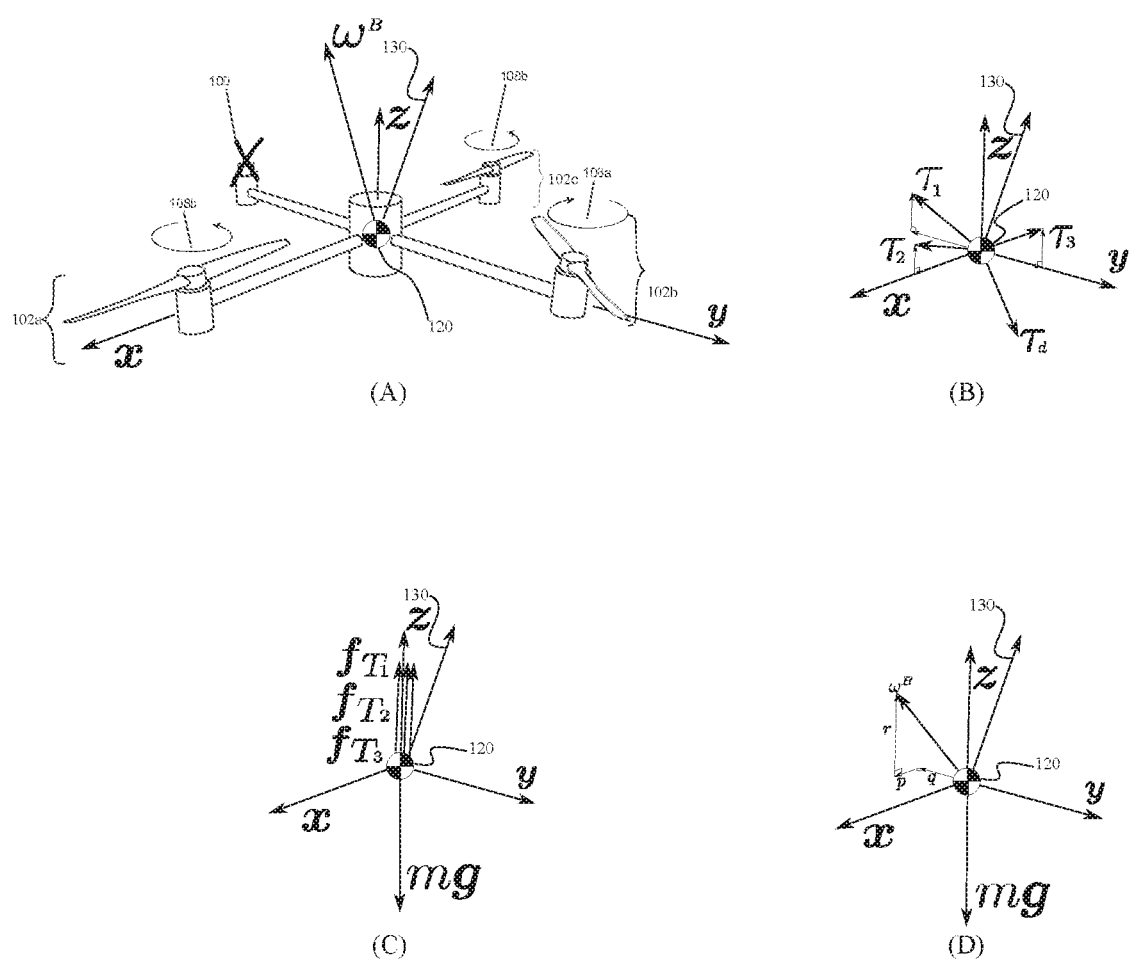
FIG. 9 shows a schematic of a quadrocopter with one failed effector, used to explain the derivation of the control method.

FIG. 9 shows a quadrocopter experiencing a single rotor failure, and utilising the present invention to control the multicopter. Without loss of generality, it is assumed that effectors 1 through 3 are still operational, and that effector has been disabled due to a failure 100. Effectors 1 and 3 rotate in the same direction 108*b*, while effector 2 rotates in the opposite direct on 108*a*. The thrust forces $f_{R_1}$, $f_{T_2}$ and $f_{T_3}$ point in the same direction, along the body z axis as shown in FIG. 9(C), and the respective torque vectors as shown in FIG. 9(B). The imbalance of the torques produced by the propellers causes the multicopter to rotate with angular velocity $\omega^B$ such that a drag torque acting on the body $\tau_d$ acts to balance the propeller torques. The present invention is used to control the multicopter's angular velocity to lie along the primary axis 130, while a target orientation of the primary axis 150 with respect to an inertial frame is attained.

In general, the primary axis 130 will no longer lie along z—one method for determining the direction of the primary axis 130 is as follows, while referring FIG. 4, and to the notation introduced for FIG. 4. Let $I^B$ be the inertia matrix of the multicopter, expressed in the body frame, such that $$I^B = \begin{bmatrix} I_X^B & 0 & 0 \\ 0 & I_X^B & 0 \\ 0 & 0 & I_Z^B \end{bmatrix}, \quad (16)$$

where it has been assumed for simplicity that the inertia matrix is diagonal and that the multicopter is symmetric such that the inertia about x equals that about y. The angular momentum of the rotors will be neglected here. Again, $\omega^B=(p, q, r)$ represents the multicopter body's angular velocity expressed in the body frame, as shown in FIG. 9(D).

Each rotor i produces a thrust force vector $f_{T_i}$, expressed in the body frame as $f_{T_i}=(0, 0, f_{T_i})$. Furthermore, each rotor i produces a torque vector, passing through the centre of mass 120, which are expressed in the body frame as $$\tau_1 = \begin{bmatrix} 0 \\ -lf_{T_1} \\ \tau_{z_1} \end{bmatrix}, \tau_2 = \begin{bmatrix} lf_{T_2} \\ 0 \\ \tau_{z_2} \end{bmatrix}, \tau_3 = \begin{bmatrix} 0 \\ lf_{T_3} \\ \tau_{z_3} \end{bmatrix}. \quad (17)$$

For simplicity, it will be assumed that the components $\tau_{z_i}$ are proportional to the thrust force, such that $\tau_{z_i}=\kappa f_{T_i}$. An aerodynamic torque $\tau_D$ is also acting on the body, assumed for simplicity here to act only in the direction of z, and proportional to r such that $\tau_D=(0, 0, -C_D r)$. The differential equation governing the evolution of the body rates can now be written as $$I^B \dot{\omega}^B = -[[\omega^B \times]] I^B \omega + \tau_1 + \tau_2 + \tau_3 + \tau_D \quad (18)$$

which can be expanded and rewritten to yield the following three differential equations $$\dot{p} = \frac{I_X^B - I_Z^B}{I_X^B} qr + \frac{l}{I_X^B} f_{T_2} \quad (19)$$

$$\dot{q} = -\frac{I_X^B - I_Z^B}{I_X^B} pr + \frac{l}{I_X^B}(f_{T_3} - f_{T_1}) \quad (20)$$

$$\dot{r} = \kappa(f_{T_1} - f_{T_2} + f_{T_1}) - C_D r. \quad (21)$$

Let $n=(n_x, n_y, n_z)$ be a unit vector fixed in the inertial frame. This vector evolves according the differential equation $$\dot{n} = -[[\omega \times]] n. \quad (22)$$

The goal is to now find the set of commanded forces $f_{T_i}$ that result in a steady rotational rate $\omega$ and a steady n, such that n then describes the primary axis 130 expressed in the body frame. This implies that $\dot{\omega}=0$ and that $\dot{n}=0$. From (22) this implies that $n=\epsilon\omega$, where $\epsilon^{-1}=\|\omega\|$ such that n is a unit vector.

This yields a set of seven algebraic equations with ten scalar unknowns to solve for (p, q, r, $n_x$, $n_y$, $n_z$, $f_{T_1}$, $f_{T_2}$, $f_{T_3}$, $\epsilon$). This can be resolved by adding three additional constraints, for example: let the first and third effector produce an equal force in steady state, that is $$f_{T_1}=f_{T_3} \quad (23)$$

and let the second propeller produce half the thrust of the third propeller such that $$f_{T_2}=f_{T_1}/2 \quad (24)$$

and let the sum of the thrust forces be such that they can achieve a target thrust force magnitude, that balances the weight of the multicopter (mg) when the primary axis 130 points to oppose gravity $$(f_{T_1}+f_{T_2}+f_{T_3})n_z=mg. \quad (25)$$

This leaves set of ten algebraic equations in ten unknowns, from which the steady-state rotational velocity $\omega^B$, the direction of the primary axis 130 in the body frame n and the steady state thrust forces $f_{T_i}$ can be calculated. It is desirable that the thrust forces $f_{T_i}$ are relatively large, i.e. far from zero. The present method of controlled flight allows a person skilled in the arts to choose target steady state thrust values where the propellers and motors have favourable characteristics.

A stabilizing controller can now be designed to bring the multicopter from some instantaneous angular velocity and orientation to the steady state solution described above. Furthermore, the orientation of the primary axis in the inertial frame can be used to translate the multicopter in space.

Note that because the second effector produces significant thrust in steady state $f_{T_2}>0$, the multicopter's centre of mass will not be stationary, but will instead continuously circle about an orbit. This because the primary axis 130 is not aligned with the direction of the effector thrusts, such that the component in the direction of gravity cancels out the weight, but the components perpendicular to gravity constantly cause the multicopter to accelerate to the centre of its orbit. Thus, when using the above described solution, the multicopters centre of mass is unable to remain stationary at a point in space but will instead have a continuous motion around this target point in space.

Figure 4:
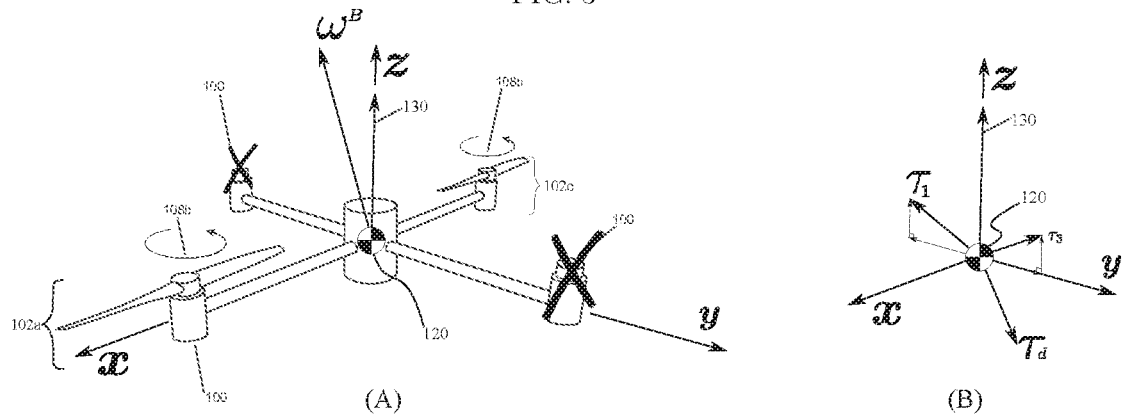
FIG. 4 shows a schematic of a quadrocopter experiencing two rotor failures and the torques and forces used to explain the derivation of the control method.
Figure 4:
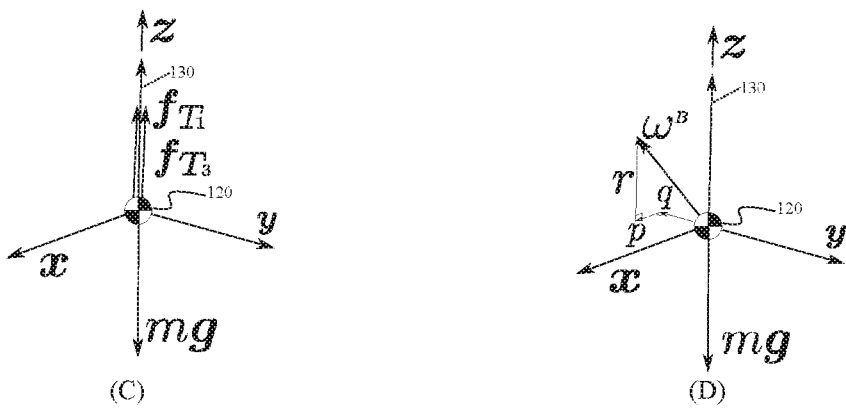

For the case of a quadrocopter having three remaining propellers, an alternative strategy would be to disable the one remaining working propeller which spins in a different direction from the others, allowing then the strategy introduced for FIG. 4 to be applied for control. However, this would then require that each propeller must produce half the multicopter's weight to maintain the multicopter's altitude, while with three propellers the fraction of weight that each remaining propeller carries will be closer to a third, making this a more attractive option. The present invention allows a person skilled in the arts to choose either of these two options.

Figure 10:
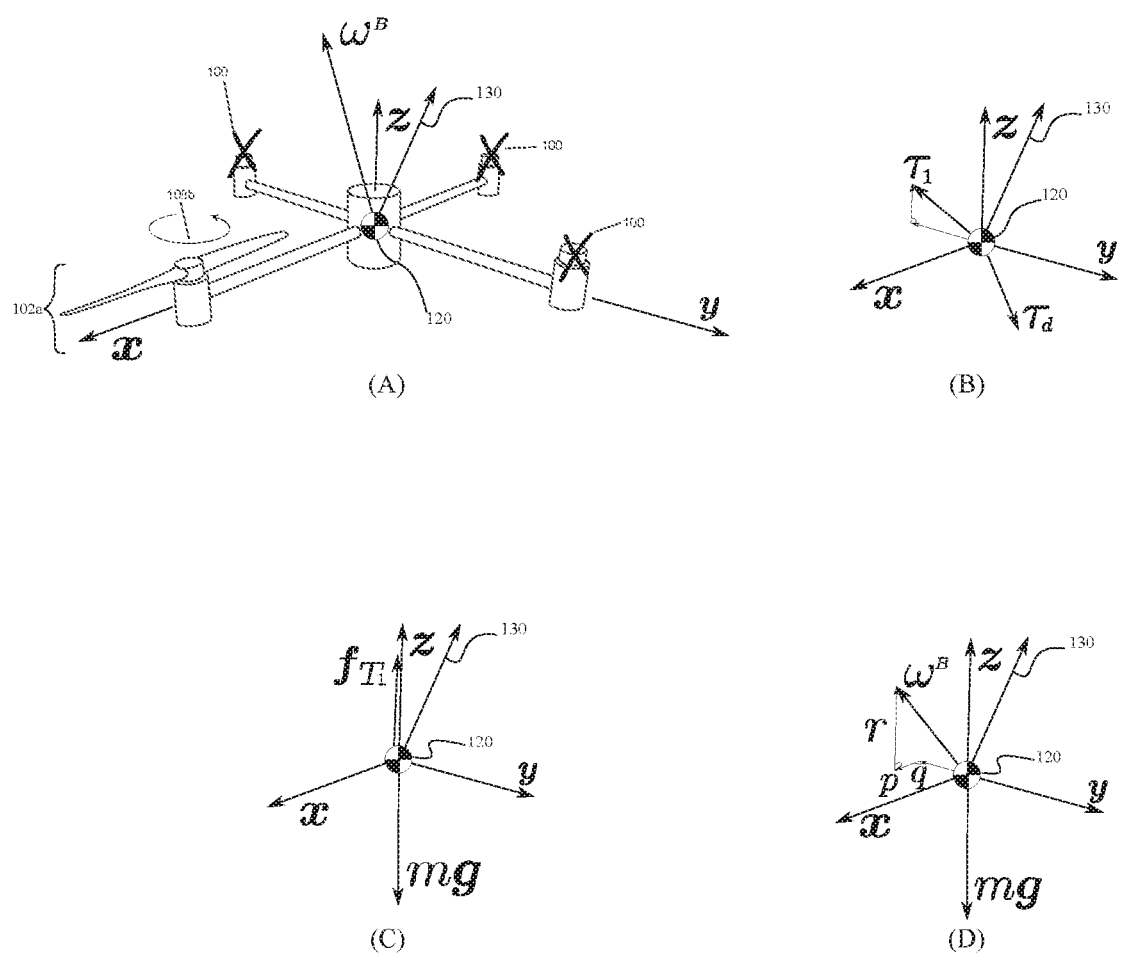
FIG. 10 shows a schematic of a quadrocopter with three failed effectors, used to explain the derivation of the control method.

FIG. 10 shows a quadrocopter experiencing three rotor failures, and utilising the present invention to control the multicopter using the single remaining propeller. Without loss of generality, it is assumed that effector 1 is still operational, and that effectors 2, 3 and 4 have been disabled by a failure 100. The thrust force $f_{T_1}$, points along the body z axis as shown in FIG. 10(C), and the respective torque vector as shown in FIG. 10(B). The imbalance of the torque produced by the propeller causes the multicopter to rotate with angular velocity $\omega^B$ such that a drag torque acting on the body $\tau_d$ acts to balance the propeller torques. The present invention is used to control the multicopter's angular velocity to lie along the primary axis 130, while a target orientation of the primary axis 150 with respect to an inertial frame is attained.

In general, the primary axis 130 will not lie along z—one method for determining the direction of the primary axis 130 is as follows, while referring to the notation introduced previously for FIG. 4, and FIG. 4. Let $I^B$ be the inertia matrix of the multicopter, expressed in the body frame, such that $$I^B = \begin{bmatrix} I_X^B & 0 & 0 \\ 0 & I_X^B & 0 \\ 0 & 0 & I_Z^B \end{bmatrix}, \quad (26)$$

where it has been assumed for simplicity that the inertia matrix is diagonal and that the multicopter is symmetric such that the inertia about x equals that about y. The angular momentum of the rotors will be neglected here. Again, $\omega^B = (p, q, r)$ represents the multicopter body's angular velocity expressed in the body frame, as shown in FIG. 10(D).

The rotor produces a thrust force vector $f_{T_1}$, expressed in the body frame as $f_{T_1} = (0, 0, f_{T_1})$. Furthermore, the rotor produces a torque vector, passing through the centre of mass 120, which is expressed in the body frame as $$\tau_1 = \begin{bmatrix} 0 \\ -l f_{T_1} \\ \tau_{z_1} \end{bmatrix}, \quad (27)$$

For simplicity, it will be assumed that the component $\tau_{z_1}$ is proportional to the thrust force, such that $\tau_{z_1} = \kappa f_{T_1}$. An aerodynamic torque $\tau_D$ is also acting on the body, assumed for simplicity here to act only in the direction of z, and proportional to r such that $\tau_D = (0, 0, -C_D r)$. The differential equation governing the evolution of the body rates can now be written as $$I^B \dot{\omega}^B = -[[\omega^B \times]] I^B \omega + \tau_1 + \tau_D \quad (28)$$

which can be expanded and rewritten to yield the following three differential equations:

$$\dot{p} = \frac{I_X^B - I_Z^B}{I_X^B} qr \quad (29)$$

$$\dot{q} = -\frac{I_X^B - I_Z^B}{I_X^B} pr - \frac{l}{I_X^B} f_{T_1} \quad (30)$$

$$\dot{r} = \kappa f_{T_1} - C_D r. \quad (31)$$

Let $n = (n_x, n_y, n_z)$ be a unit vector fixed in a predefined reference frame 160, taken to be inertial. This vector evolves according to the differential equation $$\dot{n} = -[[\omega \times]] n. \quad (32)$$

The goal is to now find the commanded force $f_{T_1}$ that results in a steady rotational rate $\omega$ and a steady n, such that n then describes the primary axis 130 expressed in the body frame. This implies that $\dot{\omega} = 0$ and that $\dot{n} = 0$. From (32) this implies that $n = \epsilon \omega$, where $\epsilon^{-1} = \|\omega\|$ such that n is a unit vector.

This yields a set of algebraic equations with scalar unknowns to solve for (p, q, r, $n_x$, $n_y$, $n_z$, $f_T$, $\epsilon$). This can be resolved by adding one additional constraint, specifically that the thrust force be able to balance the weight of the multicopter mg:

$$f_{T_1} n_z = mg. \quad (33)$$

This leaves a set of eight algebraic equations in eight unknowns, from which the steady-state rotational velocity $\omega^B$, the direction of the primary axis 130 in the body frame n and the steady state thrust force $f_{T_1}$ can be calculated.

A stabilizing controller can now be designed to bring the multicopter from some instantaneous angular velocity and orientation to the steady state solution described above. Furthermore, the orientation of the primary axis in the inertial frame can be use to translate the multicopter in space. One method of creating such a controller would be to linearise the equations of motion about the equilibrium and then do a Linear Quadratic Control synthesis.

The low frequency component of $f_{T_1}$ can be used to achieve the target thrust when averaged over a predefined period, while the high frequency component can be used to control the orientation of the primary axis.

Note that because the effector thrust is not aligned with the gravity vector, the multicopter's centre of mass will not be stationary, but will instead continuously circle about an orbit. This is because the primary axis 130 is not aligned with the direction of the effector thrusts, such that the component in the direction of gravity cancels out the weight, but the components perpendicular to gravity constantly cause the multicopter to accelerate to the centre of its orbit. Thus, when using the above described solution, the multicopter's centre of mass is unable to remain stationary at a point in space, but will instead have a continuous motion around this target point in space.

Note that, in the preceding, the primary rotation is not necessarily about a principle axis of inertia.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained the above description and shown in the accompanying drawings shall be interpreted as illustrative and not in a limiting sense.

| TABLE OF SYMBOLS AND FIG. NUMERALS | |
|---|---|
| Num. | Name |
| 100 | Effector disabled due to a failure |
| 102 | Effectors |
| 102a | Effector 1 |
| 102b | Effector 2 |
| 102c | Effector 3 |
| 102d | Effector 4 |
| 104 | Propellers |
| 106 | Motors |
| 108 | Direction of propeller rotation |
| 108a | Clockwise direction of propeller rotation |
| 108b | Counterclockwise direction of propeller rotation |
| 110 | Drive axis of rotation of propeller |
| 112 | Multicopter body |
| 114 | Mechanical structure |
| 118 | Direction of sustained multicopter rotation about primary axis |
| 120 | Center of mass of multicopter |
| 130 | Primary axis |
| 140 | Quadrocopter |
| 150 | Target orientation of primary axis |
| 160 | Predefined reference frame |
| 302 | Flight Module |
| 304 | Input Unit |
| 306 | Control Unit |
| 308 | Evaluation Unit |
| 310 | Sensing Unit |
| 312 | Memory Unit |
| 314 | Control signal for effectors |
| 602 | Outer control loop |
| 604 | Inner control loop |
| 610 | High level goal |
| 612 | Translational controller |
| 614 | High level sensors (e.g. Vision, GPS) |

-continued

TABLE OF SYMBOLS AND FIG. NUMERALS

| Num. | Name |
|---|---|
| 616 | Translational state estimator |
| 642 | Attitude controller |
| 644 | Inertial sensors |
| 646 | Attitude state estimator |
| 660 | Propellers |
| 802 | Failure |
| 804 | Can the multicopter produce torque? |
| 806 | Torques can be made to sum to zero, and can produce independent torques in all three dimensions? |
| 810 | Use the standard multicopter control method. |
| 812 | The multicopter is uncontrollable. |
| 816 | Use the disclosed control method. |
| $\alpha$ | Target acceleration |
| $f_{des}$ | Target thrust force magnitude |
| $f_{Di}$ | Rotor drag force vectors of rotor i |
| $f_{Ti}$ | Rotor thrust force vectors of rotor i |
| $f_{Ti}$ | Thrust force for each propeller i |
| g | Gravitational acceleration |
| m | Mass of the multicopter |
| mg | Weight of the multicopter |
| ñ | Target orientation |
| p, q | Components of the angular velocity |
| p, q | Components of the angular acceleration |
| $I^B$ | Inertia matrix |
| $f_{Ti}$ | Thrust force vectors |
| $I^B$ | Inertia matrix of the multicopter body |
| $I^R_i$ | Inertia matrix of propeller i |
| n | Orientation of the primary axis |
| R | Rotation matrix |
| x, y, z | Axes of the coordinate system |
| $\tau_i$ | Torque vector |
| $\tau_{i\parallel}$ | Torque vector component parallel to the primary axis |
| $\tau_{i\perp}$ | Torque vector component perpendicular to the primary axis |
| $\tau_d$ | Aerodynamic torque (scalar) |
| $\tau_d$ | Aerodynamic torque (vector) |
| $\tau_i$ | Torque vector of rotor i |
| $\omega^B$ | Angular velocity of the body |
| $\omega^V$ | Angular velocity of the multicopter in an inertial frame |
| $\omega^R_i$ | Angular velocity of rotor i with respect to the multicopter body (scalar) |
| $\omega^R_i$ | Angular velocity of rotor i with respect to the multicopter body (vector) |

The invention claimed is:

1. A method for operating a multicopter experiencing a failure during flight, the multicopter comprising,
a body; and
at least four effectors attached to the body, each configured to produce both a torque and a thrust force which can cause the multicopter to fly when not experiencing said failure,
the method comprising the steps of,
receiving at a control unit data which is representative of an orientation of a primary axis of said body with respect to a predefined reference frame; and
receiving at the control unit data which is representative of an angular velocity of said multicopter;
when a failure has occurred in one or more of said at least four effectors, controlling, using the control unit, the at least four effectors which are without a failure, based on said received data which is representative of the orientation of the primary axis and said received data which is representative of the angular velocity, such that the at least four effectors which are without a failure collectively produce a torque perpendicular to said primary axis and a torque along said primary axis, wherein the torque perpendicular to said primary axis causes said multicopter to move such that the orientation of said primary axis converges to a target orientation with respect to said predefined reference frame, and said torque along said primary axis causes said multicopter to rotate about said primary axis, and such that each of the at least four effectors which are without a failure individually produces a thrust force along said primary axis.

2. A method according to claim 1 wherein, if no failure has occurred in any of said at least four effectors, controlling, using the control unit, all of the at least four effectors, based on said received data which is representative of the orientation of the primary axis and said received data which is representative of the angular velocity, such that said at least four effectors collectively produce a torque perpendicular to said primary axis, wherein the torque perpendicular to said primary axis causes said multicopter to move such that the orientation of said primary axis converges to a target orientation with respect to said predefined reference frame, and such that each of said at least four effectors individually produces a thrust force along said primary axis.

3. A method according to claim 1 further comprising the step of, identifying, using an evaluation unit, when a failure has occurred in one or more of said at least four effectors, wherein the failure causes a decrease in the torque and/or the thrust force produced by each of said one or more at least four effectors.

4. A method according to claim 3 wherein said step of identifying, using an evaluation unit, when a failure has occurred in one or more of said at least four effectors, comprises, identifying, using said evaluation unit, when a failure has occurred in one or more of said at least four effectors, based on data representative of the motion of said multicopter.

5. A method according to claim 1 wherein said primary axis is an axis aligned with a sum of thrust forces produced by said one or more of said at least four effectors over a predefined time with respect to the predefined reference frame.

6. A method according to claim 1, wherein said torque along said primary axis causes said multicopter to rotate about said primary axis at a speed greater than 0.5 revolutions per second.

* * * * *